US012663874B2

(12) United States Patent
Schoen

(10) Patent No.: US 12,663,874 B2
(45) Date of Patent: Jun. 23, 2026

(54) INTEGRATION OF ARTIFICIAL REALITY INTERACTION MODES

(71) Applicant: Meta Platforms Technologies, LLC, Menlo Park, CA (US)

(72) Inventor: Hayden Schoen, Evanston, IL (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/884,475

(22) Filed: Sep. 13, 2024

(65) Prior Publication Data

US 2025/0147595 A1 May 8, 2025

Related U.S. Application Data

(63) Continuation of application No. 18/295,526, filed on Apr. 4, 2023, now Pat. No. 12,130,967, which is a
(Continued)

(51) Int. Cl.
| | |
|---|---|
| *G06F 3/01* | (2006.01) |
| *G06F 3/04815* | (2022.01) |
| *G06F 3/04842* | (2022.01) |

(52) U.S. Cl.
CPC .............. *G06F 3/017* (2013.01); *G06F 3/012* (2013.01); *G06F 3/013* (2013.01); *G06F 3/011* (2013.01);
(Continued)

(58) Field of Classification Search
CPC .......... G06F 3/011; G06F 3/012; G06F 3/013; G06F 3/017; G06F 3/04815; G06F 3/04842
See application file for complete search history.

(56) References Cited

U.S. PATENT DOCUMENTS

| | | | |
|---|---|---|---|
| 6,066,954 | A | 5/2000 | Gershenfeld et al. |
| 6,842,175 | B1 | 1/2005 | Schmalstieg et al. |

(Continued)

FOREIGN PATENT DOCUMENTS

| | | |
|---|---|---|
| CN | 102804206 A | 11/2012 |
| CN | 104050710 A | 9/2014 |

(Continued)

OTHER PUBLICATIONS

Office Action mailed Jan. 14, 2025 for Japanese Patent Application No. 2021-088901, filed on May 27, 2021, 4 pages.
(Continued)

*Primary Examiner* — Mihir K Rayan
(74) *Attorney, Agent, or Firm* — Morgan, Lewis & Bockius LLP

(57) ABSTRACT

Aspects of the present disclosure are for an interaction mode system that provides multiple interaction modes in an artificial reality environment with automatic, context-specific transitions between interaction modes. An interaction mode can specify how the interaction mode system determines direction indications and movement within an artificial reality environment and interactions for making selections or performing other actions. In some implementations, the interaction mode system can control at least four interaction modes including a no-hands, 3DoF mode, a no-hands, 6DoF mode, a gaze and gesture mode, and a ray casting mode. The interaction mode system can employ a mapping of interaction mode context factors (e.g., which components are enabled, mode settings, lighting or other environment conditions, current body positions, etc.) to interaction modes to control transitioning between particular interaction modes. The interaction mode system can also provide affordances for signaling a current interaction mode and interaction mode transitions.

20 Claims, 12 Drawing Sheets

Related U.S. Application Data continuation of application No. 17/571,671, filed on Jan. 10, 2022, now Pat. No. 11,625,103, which is a continuation of application No. 16/915,740, filed on Jun. 29, 2020, now Pat. No. 11,256,336.

(52) U.S. Cl.
CPC ...... *G06F 3/04815* (2013.01); *G06F 3/04842* (2013.01)

(56) References Cited

U.S. PATENT DOCUMENTS

| | | | |
|---|---|---|---|
| 7,542,040 B2 | 6/2009 | Templeman | |
| 7,701,439 B2 | 4/2010 | Hillis et al. | |
| 8,493,383 B1 | 7/2013 | Cook et al. | |
| 8,558,759 B1 | 10/2013 | Prada Gomez et al. | |
| 8,831,794 B2 | 9/2014 | Persaud et al. | |
| 8,902,227 B2 | 12/2014 | Harrison | |
| 8,947,351 B1 | 2/2015 | Noble | |
| 9,052,161 B2 | 6/2015 | Page | |
| 9,117,274 B2 | 8/2015 | Liao et al. | |
| 9,158,389 B1 | 10/2015 | Sharma et al. | |
| 9,159,140 B2 | 10/2015 | Hoof et al. | |
| 9,230,368 B2 | 1/2016 | Keane et al. | |
| 9,245,388 B2 | 1/2016 | Poulos et al. | |
| 9,292,089 B1 | 3/2016 | Sadek | |
| 9,342,230 B2 | 5/2016 | Bastien et al. | |
| 9,367,960 B2 | 6/2016 | Poulos et al. | |
| 9,412,010 B2 | 8/2016 | Kawaguchi et al. | |
| 9,477,368 B1 | 10/2016 | Filip et al. | |
| 9,526,983 B2 | 12/2016 | Lin | |
| 9,619,712 B2 | 4/2017 | Mullins et al. | |
| 9,811,721 B2 | 11/2017 | Tang et al. | |
| 9,817,472 B2 | 11/2017 | Lee et al. | |
| 9,818,231 B2 | 11/2017 | Coffey et al. | |
| 9,821,224 B2 | 11/2017 | Latta et al. | |
| 9,830,395 B2 | 11/2017 | Mullins et al. | |
| 9,864,910 B2 | 1/2018 | Mullins et al. | |
| 9,886,096 B2 | 2/2018 | Kang et al. | |
| 9,910,506 B2 | 3/2018 | Spießl et al. | |
| 9,940,750 B2 | 4/2018 | Dillavou et al. | |
| 10,019,131 B2 | 7/2018 | Welker et al. | |
| 10,026,231 B1 | 7/2018 | Gribetz et al. | |
| 10,043,279 B1 | 8/2018 | Eshet | |
| 10,048,760 B2 | 8/2018 | Abercrombie | |
| 10,067,559 B2 | 9/2018 | Wheeler et al. | |
| 10,067,636 B2 | 9/2018 | Palmaro | |
| 10,102,676 B2 | 10/2018 | Yajima et al. | |
| 10,133,342 B2 | 11/2018 | Mittal et al. | |
| 10,163,001 B2 | 12/2018 | Kim et al. | |
| 10,168,873 B1 | 1/2019 | Holz et al. | |
| 10,175,483 B2 | 1/2019 | Salter et al. | |
| 10,181,218 B1 | 1/2019 | Goetzinger, Jr. et al. | |
| 10,220,303 B1 | 3/2019 | Schmidt et al. | |
| 10,235,807 B2 | 3/2019 | Thomas et al. | |
| 10,248,284 B2 | 4/2019 | Itani et al. | |
| 10,303,259 B2 | 5/2019 | Brunner et al. | |
| 10,325,184 B2 | 6/2019 | Brunner et al. | |
| 10,339,721 B1 | 7/2019 | Dascola et al. | |
| 10,387,719 B2 | 8/2019 | Hutka et al. | |
| 10,416,837 B2 | 9/2019 | Reif | |
| 10,423,241 B1 | 9/2019 | Pham et al. | |
| 10,451,875 B2 | 10/2019 | Sutherland et al. | |
| 10,473,935 B1 | 11/2019 | Gribetz et al. | |
| 10,481,755 B1 | 11/2019 | Ngo et al. | |
| 10,521,944 B2 | 12/2019 | Sareen et al. | |
| 10,535,199 B1 | 1/2020 | Bond et al. | |
| 10,558,048 B2 | 2/2020 | Fukuda et al. | |
| 10,592,067 B2 | 3/2020 | Merdan et al. | |
| 10,617,956 B2 | 4/2020 | Black et al. | |
| 10,621,784 B2 | 4/2020 | Khan et al. | |
| 10,627,625 B2 | 4/2020 | Hoover et al. | |
| 10,649,212 B2 | 5/2020 | Burns et al. | |
| 10,657,694 B2 | 5/2020 | Sharma et al. | |
| 10,726,266 B2 | 7/2020 | Sharma et al. | |
| 10,802,582 B1 | 10/2020 | Clements | |
| 10,802,600 B1 | 10/2020 | Ravasz et al. | |
| 10,803,314 B2 | 10/2020 | Tian et al. | |
| 10,818,071 B1 | 10/2020 | Hoppe et al. | |
| 10,818,088 B2 | 10/2020 | Jones et al. | |
| 10,824,247 B1 | 11/2020 | Henrikson et al. | |
| 10,838,574 B2 | 11/2020 | Agarawala et al. | |
| 10,859,831 B1 | 12/2020 | Pollard et al. | |
| 10,890,653 B2 | 1/2021 | Giusti et al. | |
| 10,890,967 B2 | 1/2021 | Stellmach et al. | |
| 10,901,215 B1 | 1/2021 | Newcombe et al. | |
| 10,921,878 B2 | 2/2021 | Noris et al. | |
| 10,922,894 B2 | 2/2021 | Sculli et al. | |
| 10,943,388 B1 | 3/2021 | Hosenpud et al. | |
| 10,970,936 B2 | 4/2021 | Osborn et al. | |
| 11,019,283 B2 | 5/2021 | Carter et al. | |
| 11,030,237 B2 | 6/2021 | Itani et al. | |
| 11,030,788 B2 | 6/2021 | Grant | |
| 11,073,902 B1 | 7/2021 | Rahimi et al. | |
| 11,077,360 B2 | 8/2021 | Ohashi | |
| 11,093,103 B2 | 8/2021 | Agarawala et al. | |
| 11,099,638 B2 | 8/2021 | Johnson et al. | |
| 11,163,417 B2 | 11/2021 | Hauenstein et al. | |
| 11,170,576 B2 | 11/2021 | Ravasz et al. | |
| 11,175,730 B2 | 11/2021 | Johnson et al. | |
| 11,176,745 B2 | 11/2021 | Ravasz et al. | |
| 11,178,376 B1 | 11/2021 | Tichenor et al. | |
| 11,189,099 B2 | 11/2021 | Ravasz et al. | |
| 11,195,320 B2 | 12/2021 | Lin et al. | |
| 11,244,483 B2 | 2/2022 | Pollard et al. | |
| 11,256,336 B2 | 2/2022 | Schoen | |
| 11,257,280 B1 | 2/2022 | Pedrotti et al. | |
| 11,294,475 B1 | 4/2022 | Pinchon et al. | |
| 11,409,402 B1 | 8/2022 | Cole et al. | |
| 11,416,201 B2 | 8/2022 | Leppänen et al. | |
| 11,474,610 B2 | 10/2022 | Lee | |
| 11,609,625 B2 | 3/2023 | Johnson et al. | |
| 11,625,103 B2 | 4/2023 | Schoen | |
| 11,637,999 B1 | 4/2023 | Tichenor et al. | |
| 11,741,649 B2 | 8/2023 | Pollard et al. | |
| 11,809,617 B2 | 11/2023 | Johnson et al. | |
| 11,972,040 B2 | 4/2024 | Johnson et al. | |
| 11,989,838 B2 | 5/2024 | Kawamae et al. | |
| 12,130,967 B2 * | 10/2024 | Schoen .................. G06F 1/163 |
| 2004/0224670 A1 | 11/2004 | Hull et al. | |
| 2007/0003915 A1 | 1/2007 | Templeman | |
| 2008/0089587 A1 | 4/2008 | Kim et al. | |
| 2010/0306716 A1 | 12/2010 | Perez | |
| 2011/0009241 A1 | 1/2011 | Lane et al. | |
| 2011/0032257 A1 | 2/2011 | Peterson et al. | |
| 2011/0154266 A1 | 6/2011 | Friend et al. | |
| 2011/0254846 A1 | 10/2011 | Lee et al. | |
| 2011/0267265 A1 | 11/2011 | Stinson | |
| 2011/0310220 A1 | 12/2011 | McEldowney | |
| 2012/0069168 A1 | 3/2012 | Huang et al. | |
| 2012/0143358 A1 | 6/2012 | Adams et al. | |
| 2012/0157198 A1 | 6/2012 | Latta et al. | |
| 2012/0188279 A1 | 7/2012 | Demaine | |
| 2012/0206345 A1 | 8/2012 | Langridge | |
| 2012/0256967 A1 | 10/2012 | Baldwin et al. | |
| 2012/0275686 A1 | 11/2012 | Wilson et al. | |
| 2012/0293544 A1 | 11/2012 | Miyamoto et al. | |
| 2012/0324213 A1 | 12/2012 | Ho et al. | |
| 2013/0002551 A1 | 1/2013 | Imoto et al. | |
| 2013/0022843 A1 | 1/2013 | Tohda | |
| 2013/0026220 A1 | 1/2013 | Whelihan | |
| 2013/0042296 A1 | 2/2013 | Hastings et al. | |
| 2013/0063345 A1 | 3/2013 | Maeda | |
| 2013/0125066 A1 | 5/2013 | Klein et al. | |
| 2013/0147793 A1 | 6/2013 | Jeon et al. | |
| 2013/0211843 A1 | 8/2013 | Clarkson | |
| 2013/0265220 A1 | 10/2013 | Fleischmann et al. | |
| 2014/0125598 A1 | 5/2014 | Cheng et al. | |
| 2014/0168217 A1 | 6/2014 | Kim et al. | |
| 2014/0201666 A1 | 7/2014 | Bedikian et al. | |
| 2014/0236996 A1 | 8/2014 | Masuko et al. | |
| 2014/0357366 A1 | 12/2014 | Koganezawa et al. | |
| 2014/0375691 A1 | 12/2014 | Kasahara | |
| 2015/0009238 A1 | 1/2015 | Kudalkar | |

(56) References Cited

U.S. PATENT DOCUMENTS

| | | | |
|---|---|---|---|
| 2015/0035746 A1 | 2/2015 | Cockburn et al. | |
| 2015/0054742 A1 | 2/2015 | Imoto et al. | |
| 2015/0061998 A1 | 3/2015 | Yang et al. | |
| 2015/0062160 A1 | 3/2015 | Sakamoto et al. | |
| 2015/0062162 A1 | 3/2015 | Kim et al. | |
| 2015/0153833 A1 | 6/2015 | Pinault et al. | |
| 2015/0160736 A1 | 6/2015 | Fujiwara | |
| 2015/0169076 A1 | 6/2015 | Cohen et al. | |
| 2015/0176998 A1 | 6/2015 | Huang et al. | |
| 2015/0181679 A1 | 6/2015 | Liao et al. | |
| 2015/0206321 A1 | 7/2015 | Scavezze et al. | |
| 2015/0220150 A1 | 8/2015 | Plagemann et al. | |
| 2015/0260474 A1 | 9/2015 | Rublowsky et al. | |
| 2015/0261659 A1 | 9/2015 | Bader et al. | |
| 2015/0317831 A1 | 11/2015 | Ebstyne et al. | |
| 2015/0331576 A1 | 11/2015 | Piya et al. | |
| 2016/0027212 A1 | 1/2016 | Da Veiga et al. | |
| 2016/0027213 A1 | 1/2016 | Burns et al. | |
| 2016/0027218 A1 | 1/2016 | Salter et al. | |
| 2016/0110052 A1 | 4/2016 | Kim et al. | |
| 2016/0147308 A1 | 5/2016 | Gelman et al. | |
| 2016/0170603 A1 | 6/2016 | Bastien et al. | |
| 2016/0171771 A1 | 6/2016 | Pedrotti et al. | |
| 2016/0210784 A1 | 7/2016 | Ramsby et al. | |
| 2016/0231810 A1 | 8/2016 | Imoto et al. | |
| 2016/0266386 A1 | 9/2016 | Scott et al. | |
| 2016/0378291 A1 | 12/2016 | Pokrzywka | |
| 2017/0060230 A1 | 3/2017 | Faaborg et al. | |
| 2017/0060319 A1 | 3/2017 | Seo et al. | |
| 2017/0109936 A1 | 4/2017 | Powderly et al. | |
| 2017/0123487 A1 | 5/2017 | Hazra et al. | |
| 2017/0139472 A1 | 5/2017 | Basile, Jr. | |
| 2017/0139478 A1 | 5/2017 | Jeon et al. | |
| 2017/0147078 A1 | 5/2017 | Van Laack et al. | |
| 2017/0154467 A1 | 6/2017 | Hu | |
| 2017/0192513 A1 | 7/2017 | Karmon et al. | |
| 2017/0203213 A1 | 7/2017 | Stafford | |
| 2017/0205892 A1 | 7/2017 | Petrovskaya et al. | |
| 2017/0236320 A1 | 8/2017 | Gribetz et al. | |
| 2017/0237789 A1 | 8/2017 | Harner et al. | |
| 2017/0243401 A1 | 8/2017 | Tanaka et al. | |
| 2017/0262063 A1 | 9/2017 | Blénessy et al. | |
| 2017/0278304 A1 | 9/2017 | Hildreth et al. | |
| 2017/0287225 A1 | 10/2017 | Powderly et al. | |
| 2017/0296363 A1 | 10/2017 | Yetkin et al. | |
| 2017/0364198 A1 | 12/2017 | Yoganandan et al. | |
| 2017/0372499 A1 | 12/2017 | Lalonde | |
| 2018/0003982 A1 | 1/2018 | Burns et al. | |
| 2018/0005443 A1 | 1/2018 | Poulos et al. | |
| 2018/0024623 A1 | 1/2018 | Faaborg et al. | |
| 2018/0059901 A1 | 3/2018 | Gullicksen | |
| 2018/0095635 A1 | 4/2018 | Valdivia et al. | |
| 2018/0107278 A1 | 4/2018 | Goel et al. | |
| 2018/0113599 A1 | 4/2018 | Yin | |
| 2018/0144556 A1 | 5/2018 | Champion et al. | |
| 2018/0164982 A1 | 6/2018 | Rakshit et al. | |
| 2018/0190022 A1 | 7/2018 | Zamir et al. | |
| 2018/0224928 A1 | 8/2018 | Ross et al. | |
| 2018/0307303 A1 | 10/2018 | Powderly et al. | |
| 2018/0310116 A1 | 10/2018 | Arteaga et al. | |
| 2018/0322701 A1 | 11/2018 | Pahud et al. | |
| 2018/0335925 A1 | 11/2018 | Hsiao et al. | |
| 2018/0349690 A1 | 12/2018 | Rhee et al. | |
| 2018/0357780 A1 | 12/2018 | Young et al. | |
| 2019/0033989 A1 | 1/2019 | Wang et al. | |
| 2019/0043259 A1 | 2/2019 | Wang et al. | |
| 2019/0050062 A1* | 2/2019 | Chen | G06T 7/70 |
| 2019/0094981 A1 | 3/2019 | Bradski et al. | |
| 2019/0097981 A1 | 3/2019 | Koyun et al. | |
| 2019/0102927 A1 | 4/2019 | Yokokawa | |
| 2019/0102941 A1 | 4/2019 | Khan et al. | |
| 2019/0107894 A1 | 4/2019 | Hebbalaguppe et al. | |
| 2019/0130655 A1 | 5/2019 | Gupta et al. | |
| 2019/0188895 A1 | 6/2019 | Miller, IV et al. | |
| 2019/0196577 A1 | 6/2019 | Sronipah et al. | |
| 2019/0213792 A1 | 7/2019 | Jakubzak et al. | |
| 2019/0258318 A1 | 8/2019 | Qin et al. | |
| 2019/0278376 A1 | 9/2019 | Kutliroff et al. | |
| 2019/0279424 A1 | 9/2019 | Clausen et al. | |
| 2019/0286231 A1 | 9/2019 | Burns et al. | |
| 2019/0310757 A1 | 10/2019 | Lee et al. | |
| 2019/0317596 A1 | 10/2019 | Sato | |
| 2019/0320138 A1 | 10/2019 | Kaufthal | |
| 2019/0340818 A1 | 11/2019 | Furtwangler | |
| 2019/0355272 A1 | 11/2019 | Nusbaum et al. | |
| 2019/0362557 A1 | 11/2019 | Lacey et al. | |
| 2019/0362562 A1 | 11/2019 | Benson | |
| 2019/0369391 A1 | 12/2019 | Cordesses et al. | |
| 2019/0377416 A1 | 12/2019 | Alexander | |
| 2020/0001461 A1 | 1/2020 | Cappello et al. | |
| 2020/0012341 A1 | 1/2020 | Stellmach et al. | |
| 2020/0033957 A1 | 1/2020 | Bieglmayer | |
| 2020/0064908 A1 | 2/2020 | Boucher | |
| 2020/0082629 A1 | 3/2020 | Jones et al. | |
| 2020/0097077 A1 | 3/2020 | Nguyen et al. | |
| 2020/0097091 A1 | 3/2020 | Chou et al. | |
| 2020/0103521 A1 | 4/2020 | Chiarella et al. | |
| 2020/0103963 A1 | 4/2020 | Kelly et al. | |
| 2020/0134895 A1 | 4/2020 | Pollard et al. | |
| 2020/0143598 A1 | 5/2020 | Riordan | |
| 2020/0209949 A1 | 7/2020 | Noris et al. | |
| 2020/0210137 A1 | 7/2020 | Noris et al. | |
| 2020/0218423 A1 | 7/2020 | Ohashi | |
| 2020/0225736 A1 | 7/2020 | Schwarz et al. | |
| 2020/0225758 A1 | 7/2020 | Tang et al. | |
| 2020/0225830 A1 | 7/2020 | Tang et al. | |
| 2020/0226814 A1 | 7/2020 | Tang et al. | |
| 2020/0241646 A1 | 7/2020 | Hebbalaguppe et al. | |
| 2020/0249746 A1 | 8/2020 | Gkaintatzis | |
| 2020/0272231 A1 | 8/2020 | Klein et al. | |
| 2020/0379576 A1 | 12/2020 | Chen et al. | |
| 2021/0012113 A1 | 1/2021 | Petill et al. | |
| 2021/0072817 A1 | 3/2021 | Bond et al. | |
| 2021/0090331 A1 | 3/2021 | Ravasz et al. | |
| 2021/0090333 A1 | 3/2021 | Ravasz et al. | |
| 2021/0090337 A1 | 3/2021 | Ravasz et al. | |
| 2022/0130100 A1 | 4/2022 | Pedrotti et al. | |
| 2022/0358715 A1 | 11/2022 | Tanner et al. | |
| 2023/0188533 A1 | 6/2023 | LeBeau et al. | |
| 2023/0244321 A1 | 8/2023 | Schoen | |
| 2023/0325046 A1 | 10/2023 | De Almeida E De Vincenzo et al. | |
| 2024/0329729 A1 | 10/2024 | Johnson et al. | |
| 2025/0068291 A1 | 2/2025 | De Almeida E De Vincenzo et al. | |

FOREIGN PATENT DOCUMENTS

| | | |
|---|---|---|
| CN | 104380237 A | 2/2015 |
| CN | 106575155 A | 4/2017 |
| CN | 206961066 U | 2/2018 |
| CN | 107992189 A | 5/2018 |
| CN | 108292040 A | 7/2018 |
| CN | 109478101 A | 3/2019 |
| JP | 2009037434 A | 2/2009 |
| JP | 2014099184 A | 5/2014 |
| JP | 2017201524 A | 11/2017 |
| JP | 2018516422 A | 6/2018 |
| JP | 2018198075 A | 12/2018 |
| JP | 2019517049 A | 6/2019 |
| JP | 2019533846 A | 11/2019 |
| KR | 20110057921 A | 6/2011 |
| KR | 20180124136 A | 11/2018 |
| WO | 2017104525 A1 | 6/2017 |
| WO | 2018235371 A1 | 12/2018 |

OTHER PUBLICATIONS

Office Action mailed Jan. 16, 2025 for Chinese Application No. 202080081235.1, filed Nov. 3, 2020, 13 pages.

European Search Report for European Application No. 21172954.6, mailed Oct. 29, 2021, 11 pages.

(56) References Cited

OTHER PUBLICATIONS

Hincapie-Ramos J.D., et al., "GyroWand: IMU-Based Raycasting for Augmented Reality Head-Mounted Displays," Proceedings of the 3rd Association for Computing Machinery (ACM) Symposium on Spatial User Interaction, Los Angeles, CA, USA, Aug. 8-9, 2015, pp. 89-98.

International Preliminary Report on Patentability for International Application No. PCT/US2020/058648, mailed Jun. 16, 2022, 10 pages.

International Search Report and Written Opinion for International Application No. PCT/US2020/051763, mailed Feb. 3, 2021, 11 Pages.

International Search Report and Written Opinion for International Application No. PCT/US2020/052976, mailed Dec. 11, 2020, 10 Pages.

International Search Report and Written Opinion for International Application No. PCT/US2020/058648, mailed Feb. 23, 2021, 12 Pages.

International Search Report and Written Opinion for International Application No. PCT/US2021/038826, mailed Oct. 19, 2021, 12 pages.

Katz N., et al., "Extending Web Browsers with a Unity 3D-Based Virtual Worlds Viewer," IEEE Computer Society, Sep./Oct. 2011, vol. 15 (5), pp. 15-21.

Mayer S., et al., "The Effect of Offset Correction and Cursor on Mid-Air Pointing in Real and Virtual Environments," Proceedings of the 2018 CHI Conference on Human Factors in Computing Systems, Montreal, QC, Canada, Apr. 21-26, 2018, pp. 1-13.

Office Action mailed Jun. 19, 2024 for Chinese Application No. 202110592331.9, filed May 28, 2021, 8 pages.

Olwal A., et al., "The Flexible Pointer: An Interaction Technique for Selection in Augmented and Virtual Reality," Proceedings of ACM Symposium on User Interface Software and Technology (UIST), Vancouver, BC, Nov. 2-5, 2003, pp. 81-82.

Qiao X., et al., "Web AR: A Promising Future for Mobile Augmented Reality—State of the Art. Challenges, and Insights," Proceedings of the IEEE, Apr. 2019, vol. 107 (4), pp. 651-666.

Renner P., et al., "Ray Casting", Central Facility Labs [Online], [Retrieved on Apr. 7, 2020], 2 pages, Retrieved from the Internet: URL:https://www.techfak.uni-bielefeld.de/~tpfeiffe/lehre/VirtualReality/interaction/ray_casting.html.

Schweigert R., et al., "EyePointing: A Gaze-Based Selection Technique," Proceedings of Mensch and Computer, Hamburg, Germany, Sep. 8-11, 2019, pp. 719-723.

Srinivasa R.R., "Augmented Reality Adaptive Web Content," 13th IEEE Annual Consumer Communications & Networking Conference (CCNC), 2016, pp. 1-4.

Unity Gets Toolkit for Common AR/VR Interactions, Unity XR interaction Toolkit Preview [Online], Dec. 19, 2019 Retrieved on Apr. 7, 2020], 1 page, Retrieved from the Internet: URL: http://youtu.be/ZPhv4qmT9EQ.

Extended European Search Report for European Patent Application No. 25168972.5, dated Jun. 26, 2025, 8 pages.

Notice of Allowance mailed Aug. 1, 2025 for U.S. Appl. No. 18/623,425, filed Apr. 1, 2024, 2 pages.

Notice of Allowance mailed Aug. 11, 2025 for U.S. Appl. No. 18/623,425, filed Apr. 1, 2024, 2 pages.

Notice of Allowance mailed Jul. 15, 2025 for U.S. Appl. No. 18/623,425, filed Apr. 1, 2024, 9 pages.

Office Action mailed Jul. 2, 2025 for Chinese Application No. 202080081235.1, filed Nov. 3, 2020, 12 pages.

Office Action mailed Aug. 7, 2025 for European Patent Application No. 21742998.4, filed on Jun. 24, 2021, 8 pages.

Office Action mailed Aug. 19, 2025 for Japanese Application No. 2022-579982, filed on Jun. 24, 2021, 3 pages.

Office Action mailed Oct. 20, 2025 for Korean Application No. 10-2021-0067565, filed May 26, 2021, 5 pages.

Office Action mailed Mar. 25, 2025 for Japanese Application No. 2022-579982, filed on Jun. 24, 2021, 4 pages.

Office Action mailed Jul. 27, 2025 for Korean Application No. 10-2023-7002566, filed Jun. 24, 2021, 14 pages.

Office Action mailed Sep. 30, 2025 for Korean Application No. 10-2022-7023045, filed Nov. 3, 2020, 12 pages.

Extended European Search Report for European Patent Application No. 25217752.2, dated Mar. 4, 2026, 12 pages.

Long Q., et al., "Technical Note: Towards Virtual Monitors for Image Guided Interventions Real-Time Streaming to Optical See-Through Head-Monuted Displays," Oct. 3, 2017, 6 pages, Reterived from the Internet URL: https://arxiv.org/abs/1710.00808v1.

* cited by examiner

100

101
102
103

Input Devices 120

Display 130

Other I/O 140

Processors 110

Memory 150

Program Memory 160

Operating System 162

Interaction Mode System 164

Other Applications 166

Data Memory 170

INTEGRATION OF ARTIFICIAL REALITY INTERACTION MODES

CROSS-REFERENCE TO RELATED APPLICATIONS

This patent application is a continuation of U.S. patent application Ser. No. 18/295,526, filed Apr. 4, 2023, entitled "Integration of Artificial Reality Interactions Modes", which is a continuation of U.S. patent application Ser. No. 17/571, 671, filed Jan. 10, 2022, entitled "Integration of Artificial Reality Interactions Modes", now U.S. Pat. No. 11,625,103, issued on Apr. 11, 2023, which is a continuation of U.S. patent application Ser. No. 16/915,740 filed Jun. 29, 2020, entitled "Integration of Artificial Reality Interactions Modes", now U.S. Pat. No. 11,256,336, issued on Feb. 22, 2022; all of which are incorporated herein by reference in their entirety.

TECHNICAL FIELD

The present disclosure is directed to an artificial reality environment that can switch between different interaction modes depending on a context of an artificial reality device.

BACKGROUND

Various artificial reality systems can be embodied in wearable devices, in systems with external displays and sensors, in passthrough systems, etc. Numerous interaction modes have been created for these artificial reality systems, each of which typically provides ways for a user to indicate a direction and/or position and to take actions in relation to the indicated direction and/or position. For example, some interaction modes allow a user to move in three degrees of freedom ("3DoF"—typically allowing indications of direction in the pitch, roll, and yaw axes, without X, Y, or Z, axis movement), while others interaction modes allow movement in six degrees of freedom ("6DoF"—typically allowing movement in the pitch, roll, yaw, X, Y, and Z axes). Some interaction modes use controllers, others track hand position and gestures, while yet others track only head movement. Interaction modes may be based on motion sensors, various types of cameras, time-of-flight sensors, timers, etc. However, with all the options and possible combinations available for interaction modes, many artificial reality systems use an interaction mode only tailored to particular situations while being difficult to use or inappropriate for other situations. For example, users find it frustrating to use head-tracking only interaction modes when performing complex interactions. Additionally, users also often do not want to use controllers or hand tacking inputs when performing simple interactions or when in public settings. While some systems use multiple interaction modes, they often require manual user selection to switch between modes or do not automatically switch to an interaction mode appropriate to the current context.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
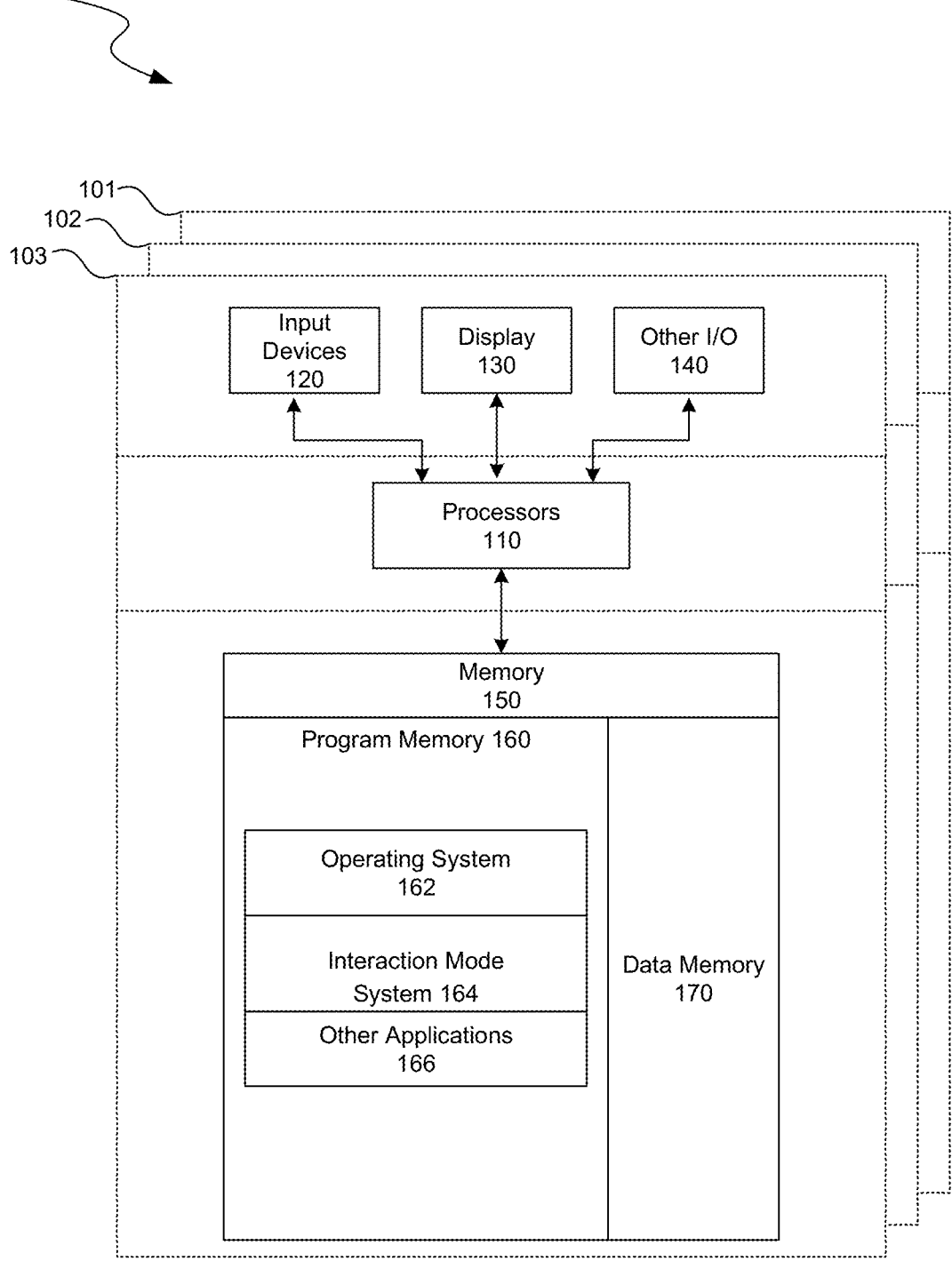
FIG. 1 is a block diagram illustrating an overview of devices on which some implementations of the present technology can operate.

Aspects of the present disclosure are for an interaction mode system that provides multiple interaction modes in an artificial reality environment with automatic, context-specific transitions between interaction modes. An interaction mode can specify how the interaction mode system determines (a) direction indications and movement within an artificial reality environment and (b) interactions for making selections or performing other actions. The interaction mode system also provides affordances for signaling a current interaction mode and interaction mode transitions. The interaction mode system can control multiple interaction modes and can employ a mapping of interaction mode context factors to interaction modes to control transitioning between interaction modes. Users manually activating software or hardware controls, performing interaction mode transition gestures, or other explicit commands can also cause additional interaction mode transitions.

The interaction mode context factors can include, e.g., which hardware components are enabled or disabled (via hardware or software control); which software modules are enabled or disabled; current privacy, power, or accessibility settings; environment conditions (e.g., lighting, position detection factors such as surface types or marker availability, area-based camera restrictions, determined area types, amount of surrounding people or identified specific surrounding people, etc.); current body positions (e.g., whether hands are in view, hand orientation, gestures being performed); current controller position or status; etc.

The interaction mode system can determine the interaction mode context by integrating input from various subsystems such as head tracking, position tracking, eye tracking, hand tracking, other camera-based systems, hardware controllers, simultaneous localization and mapping (SLAM)

systems, or other data sources. A head tracking sub-system can identify an orientation of a user's head, e.g., based on one or more of data from an inertial motion unit (IMU—discussed below), tracked light emitted by a head mounted device, a camera or other external sensor directed to capture a representation of the user's head, or combinations thereof. A position tracking sub-system can identify a user position within an artificial reality environment, e.g., based on tracked light emitted by a wearable device, time-of-flight sensors, environment mapping based on traditional and/or depth camera data, IMU data, GPS data, etc. An eye tracking sub-system can identify a gaze direction relative to a head-mounted device by modeling one or both of the user's eyes to determine a gaze direction vector, often along the line connecting the user's fovea and the center of the user's pupil, e.g., based on factors such as images capturing a circle of lights (i.e., "glints") reflected off the user's eye. A hand tracking sub-system can determine position, pose, and/or movements of the user's hands, e.g., based on images from one or more cameras that depict one or more of the user's hands and/or sensor data from devices worn by the user such as gloves, rings, wrist bands, etc. Information from other camera systems can gather additional information such as lighting conditions, environment mapping, etc. Each of the sub-systems can provide result data (e.g., head orientation, position, eye orientation, hand pose and position, body pose and position, environment data, mapping data, etc.) as well as sub-system meta-data such as whether aspects of the sub-system are enabled and whether the sub-system has access to certain types of data (e.g., whether certain sets of cameras or other sensors are enabled, battery level, accuracy estimates for related result data, etc.)

In some implementations, the interaction mode system can control at least four interaction modes including a no-hands, 3DoF mode; a no-hands, 6DoF mode; a gaze and gesture mode; and a ray casting mode. The no-hands, 3DoF interaction mode can track only three degrees of freedom indicating roll, yaw, and pitch direction (though the user can indicate X, Y, and Z position movement through other means such as a joystick on a controller). Tracking in 3DoF can amount to a direction as a vector with an origin at an artificial reality device and the vector extending to a point on a sphere surrounding the origin, where the point on the sphere is identified based on IMU data. In some implementations, the vector can be modified based on an identified gaze direction of the user. Based on this vector, a "gaze cursor" can be provided in the user's field-of-view, either in the center of the field-of-view where eye tracking is not available or positioned according to where the user's eyes are focused where eye tracking is available. While in the no-hands, 3DoF interaction mode, the interaction mode system can use a dwell timer that begins counting down when the direction vector does not make a threshold change within a time period and is reset when time the threshold change in the direction vector is detected. When the dwell timer counts down to zero, this can indicate a user action. Such an action, in combination with the vector direction, can cause a selection or other actuation of an object indicated by the gaze cursor. See FIGS. 6 and 10 and the associated description below for additional details on gaze cursors and dwell timers configured in accordance with the present technology. Interaction mode context factors that can trigger a transition to the no-hands, 3DoF interaction mode can include factors such as when position tracking cameras are off or otherwise unavailable (e.g., when in low power mode, privacy mode, public mode, etc.) or when lighting conditions are such that reliable position and hand tracking cannot be accomplished.

The no-hands, 6DoF interaction mode can be similar to the no-hands, 3DoF interaction mode, except that the no-hands, 6DoF interaction mode system tracks not only the direction vector for a gaze cursor, but also user position movement within the artificial reality environment. As in the no-hands, 3DoF interaction mode, actions in the no-hands, 6DoF interaction mode can include directing the gaze cursor (which now can be done by the user changing her direction and position) and using the dwell timer to perform actions in relation to the gaze cursor. Interaction mode context factors that can trigger a transition to the no-hands, 6DoF interaction mode can include an indication that position tracking systems are enabled but that either (a) a hand tracking system is not enabled or lighting conditions are not sufficient to track hand position or (b) that there is no detection of a hand "ready state." A ready state can occur when the user's hands are in the user's field-of-view, raised above a threshold position, and/or are in a particular configuration (e.g., palm up).

The gaze and gesture interaction mode can be a version of the 6DoF or 3DoF interaction mode where direction is based on a gaze cursor, but instead of (or in addition to) using a dwell timer for actions, a user can indicate actions using hand gestures. For example, when a hand is in the user's field-of-view with the palm facing up, an action can be indicated by making a thumb and finger "pinch" gesture. Other gestures can also be used such as an air tap, air swipe, grab, or other identifiable motion or posture. Interaction mode context factors that can trigger a transition to the gaze and gesture interaction mode can include an identification that a hand tracking system is enabled and that a user's hands are in the ready state. In some implementations, transitioning to the gaze and gesture interaction mode can further require availability of a position tracking system for movement in 6DoF. See FIG. 8 for additional details on the gaze and gesture interaction mode.

The ray casting interaction mode can replace the gaze cursor with a ray that extends from the user's hand into the artificial reality environment. For example, a ray can be specified along a line connecting an origin point (e.g., a hand center-of-mass or a user's eye, shoulder, or hip) with a control point (e.g., a point relative to the user's hand). Hand gestures similar to those used in the gaze and gesture interaction mode can be used to indicate actions. Interaction mode context factors that can trigger a transition to the ray casting interaction mode can include the hand tracking system being available and the user's hand being in a ray casting pose (e.g., both (a) in the user's field-of-view or positioned above a threshold and (b) positioned with the palm downward.) See FIG. 9 and the associated description below for additional details on the ray casting interaction mode.

In some implementations, other controls can augment or replace the direction and/or selection determinations in any of the above interaction modes. For example, a user can indicate direction with a controller and/or press buttons on the controller to indicate selection or other actions, can indicate directions or actions using paired devices (e.g., by swiping a gesture or tapping on a touch screen, performing a scroll action on a capacitance sensor such as on a watch or ring, etc.)

Embodiments of the disclosed technology may include or be implemented in conjunction with an artificial reality system. Artificial reality or extra reality (XR) is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

Existing XR systems have developed a number of interaction modes including features such as ray casting, air tapping, dwell timers, and gaze cursors. However, existing XR systems fail to provide automatic transitions between interaction modes using these features, either requiring a user to manually change the interaction mode, use the same interaction mode for all interactions with a particular application, or requiring the application to specify an interaction mode, regardless of the context. However, this raises issues when the current interaction mode is not appropriate for the current context—such as when conditions do not allow aspects of the current interaction mode to function properly (e.g., when an interaction mode relies on hand detection and the hands are not in view, lighting conditions are poor, and/or hardware to capture and interpret hand pose is disabled), when another interaction mode would be less intrusive or provide performance benefits (e.g., when the user's hands are otherwise occupied or when making hand gestures would be socially awkward, when a device power is low and it is desirable to use an interaction mode with lower power requirements, etc.), or where the current interaction mode is sub-optimal for an interaction to be performed (e.g., where the current interaction mode uses a time-intensive dwell timer and successive selections are to be performed).

The interaction mode system and processes described herein are expected to overcome these problems associated with conventional XR interaction techniques, and are expected to (a) provide greater functionality while being more natural and intuitive than interactions in existing XR systems; (b) provide new efficiencies by selecting an interaction mode matching current power and environment conditions; and (c) make artificial reality interactions less intrusive to the user and other surrounding people. Despite being natural and intuitive, the systems and processes described herein are rooted in computerized artificial reality systems instead of being an analog of traditional object interactions. For example, existing object interaction techniques fail to provide the set of interaction modes described herein with smooth and automatic transitions between the various modes. Further, the interaction mode system and processes described herein provide improvements by making interactions available in additional situations, such as where existing XR systems have provided an interaction mode which is inoperable in the current context or with which the user cannot interact (e.g., by switching to a more appropriate interaction mode when in low-light conditions or when the user's hands are otherwise occupied).

Several implementations are discussed below in more detail in reference to the figures. FIG. 1, for example, is a block diagram illustrating an overview of devices on which some implementations of the disclosed technology can operate. The devices can comprise hardware components of a computing system 100 that switches between interaction modes either based on factors in an identified interaction mode context or in response to user controls. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, interaction mode system 164, and other application programs 166. Memory 150 can also include data memory 170 that can include, e.g., a mapping of interaction mode context factors to interaction modes for triggering interaction mode switches, configuration data, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
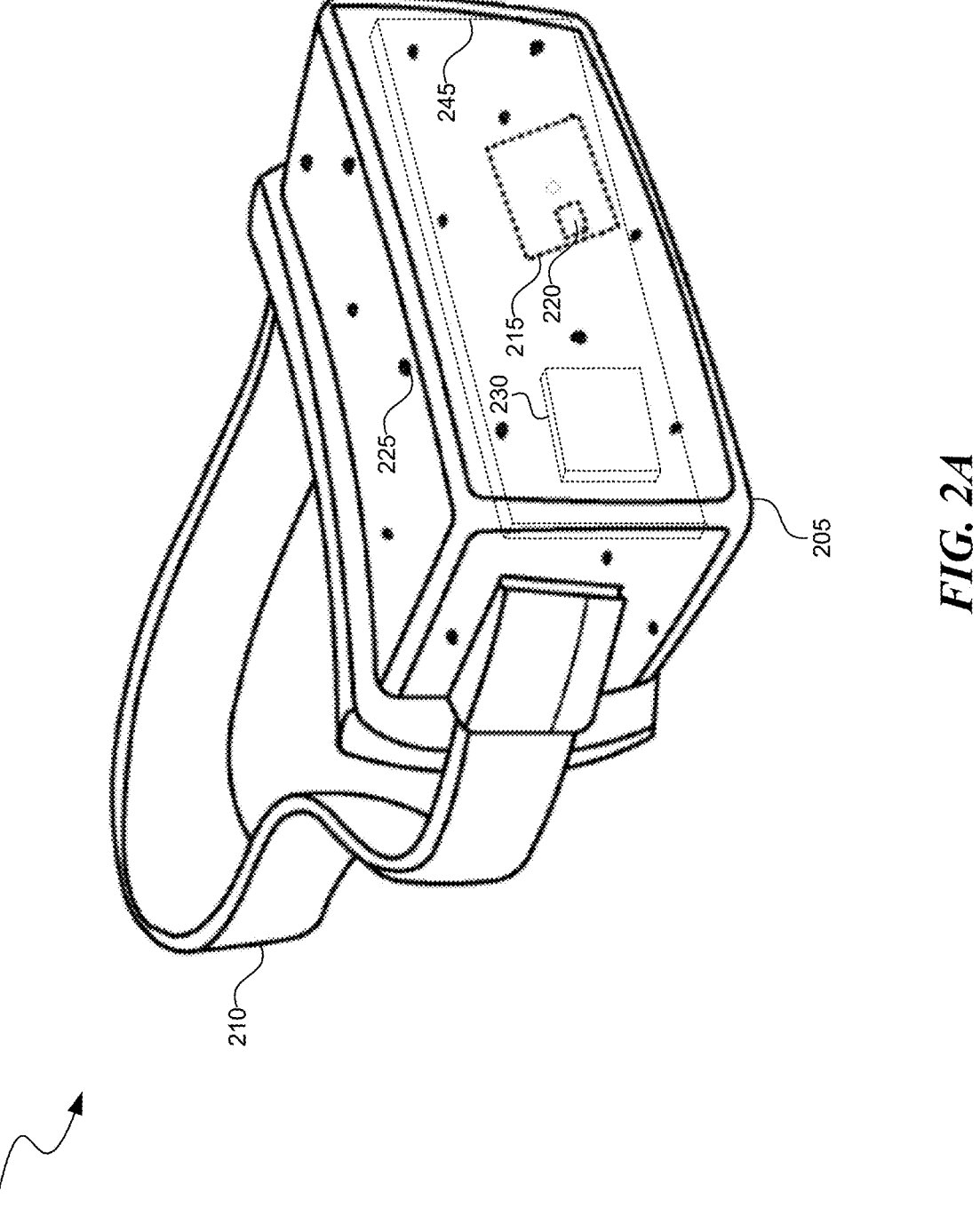
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU—also referred to as an inertial measurement unit) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in a virtual environment in three degrees of freedom (3DoF) or six degrees of freedom (6DoF). For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

In some implementations, the HMD 200 can be in communication with one or more other external devices, such as controllers (not shown) which a user can hold in one or both hands. The controllers can have their own IMU units, position sensors, and/or can emit further light points. The HMD 200 or external sensors can track these controller light points. The compute units 230 in the HMD 200 or the core processing component can use this tracking, in combination with IMU and position output, to monitor hand positions and motions of the user. The controllers can also include various buttons a user can actuate to provide input and interact with virtual objects. In various implementations, the HMD 200 can also include additional subsystems, such as an eye tracking unit, an audio system, various network components, etc. In some implementations, instead of or in addition to controllers, one or more cameras included in the HMD 200 or external to it can monitor the positions and poses of the user's hands to determine gestures and other hand and body motions.

Figure 2B:
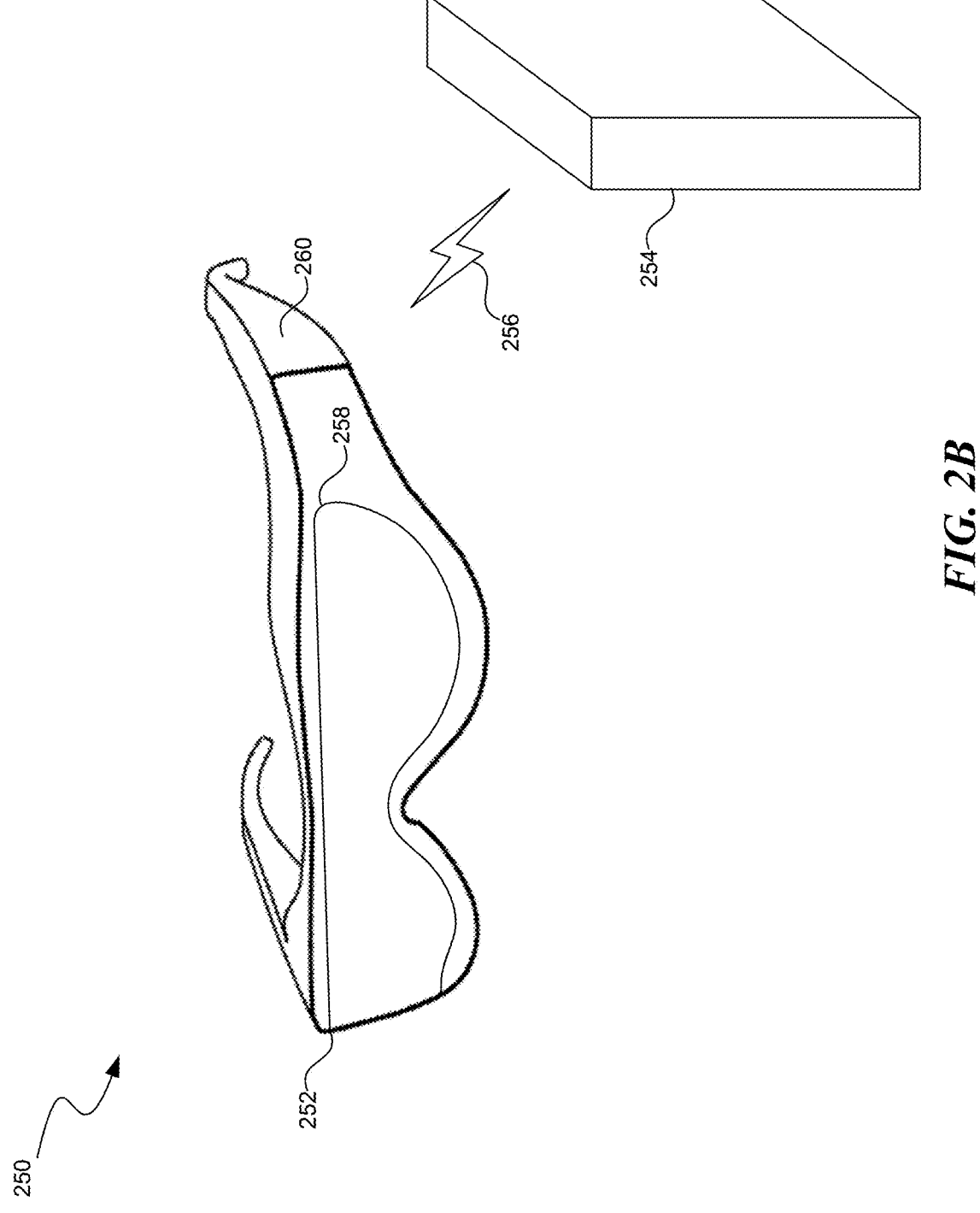
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

Figure 3:
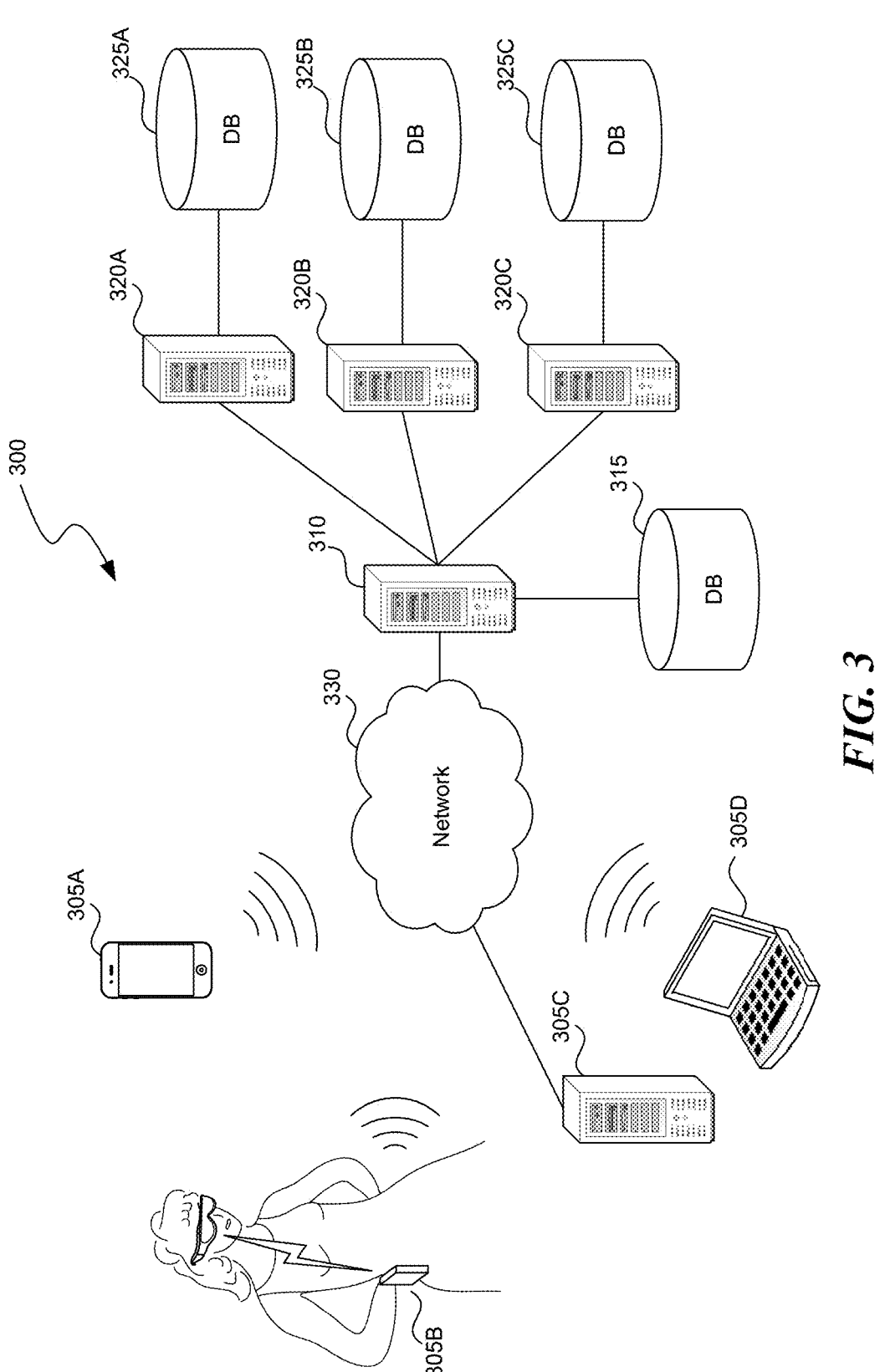
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

Figure 4:
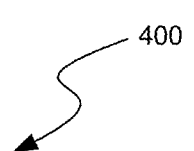
FIG. 4 is a block diagram illustrating components which, in some implementations, can be used in a system employing the disclosed technology.
Figure 4:
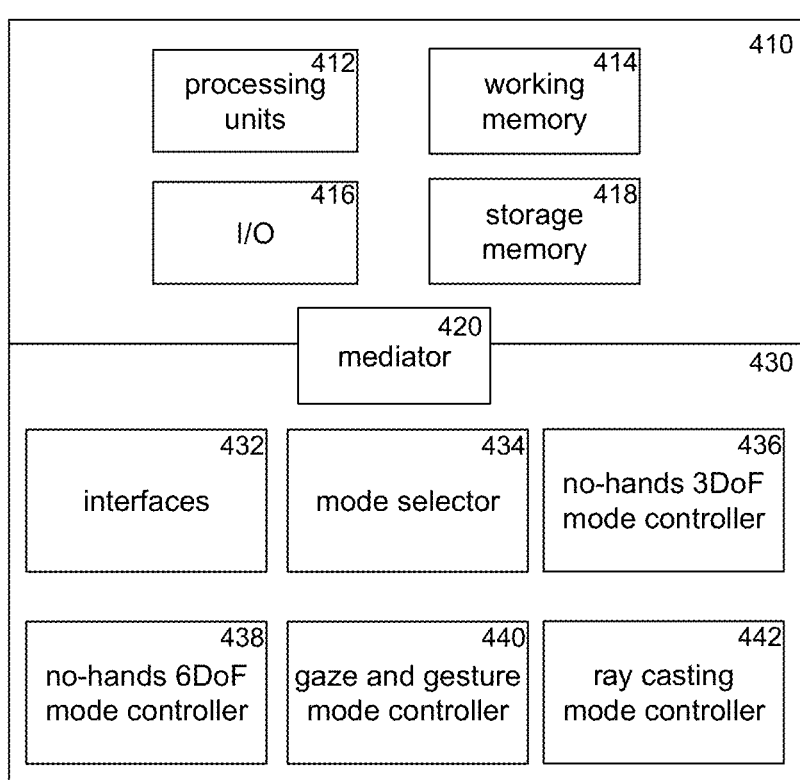

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for switching between interaction modes based on (a) factors in an identified interaction mode context or (b) in response to user controls. Specialized components 430 can include mode selector 434, no-hands, 3DoF mode controller 436, no-hands, 6DoF mode controller 438, gaze and gesture mode controller 440, ray casting mode controller 442, and components and APIs which can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430. Although depicted as separate components, specialized components 430 may be logical or other nonphysical differentiations of functions and/or may be submodules or code-blocks of one or more applications.

Mode selector 434 can identify a condition for switching interaction modes, causing control of user interactions to switch to a corresponding one of no-hands, 3DoF mode controller 436, no-hands, 6DoF mode controller 438, gaze and gesture mode controller 440, or ray casting mode controller 442. In various implementations, mode selector 434 can identify such a condition in response to an explicit user selection of an interaction mode or by mapping inter-action mode context factors to a corresponding interaction mode. The mapping can, for example, map the interaction mode context factor of no useable tracking input to the no-hand 3DoF interaction mode, map the interaction mode context factors of useable tracking input with no identifica-tion of hands in a ready state to the no-hand 6DoF interac-tion mode, map the interaction mode context factors of useable tracking input and an identification of hands in a ready state to the gaze and gesture interaction mode, and map the interaction mode context factors of useable tracking input and hands in a ray state to the ray casting interaction mode. Additional details on selecting an interaction mode based on interaction mode context factors or a user selection are provided below in relation to blocks 502-510 and 552-562 of FIG. 5.

No-hands, 3DoF mode controller 436 can provide user interactions where direction is indicated with a gaze cursor and actions are indicated with a dwell timer. No-hands, 3DoF mode controller 436 does not translate user movement in the X, Y, or Z axes into changes in the user's field-of-view. No-hands, 3DoF mode controller 436 can interface, via mediator 420, with an IMU unit of I/O 416 to determine head position and can interface, via mediator 420, with an eye tracker of I/O 416 to determine eye gaze direction, the combination of which can specify the location of the gaze cursor. Additional details on the no-hands, 3DoF interaction mode are provided below in relation to block 580 of FIG. 5.

No-hands, 6DoF mode controller 438 can provide user interactions where direction is indicated with a gaze cursor and actions are indicated with a dwell timer. No-hands, 6DoF mode controller 438 can interface, via mediator 420, with a position tracking system of I/O 416 to determine user movements along the X, Y, and Z axes and translate these into changes in the user's field-of-view. No-hands, 6DoF mode controller 438 can interface, via mediator 420, with the IMU unit of I/O 416 to determine head position and can interface, via mediator 420, with the eye tracker of I/O 416 to determine eye gaze direction, the combination of which can specify the location of the gaze cursor. Additional details on the no-hands, 6DoF interaction mode are provided below in relation to block 582 of FIG. 5.

Gaze and gesture mode controller 440 can provide user interactions where direction is indicated with a gaze cursor and actions are indicated with hand gestures. Gaze and gesture mode controller 440 can interface, via mediator 420, with a position tracking system of I/O 416 to determine user movements along the X, Y, and Z axes and translate these into changes in the user's field-of-view. Gaze and gesture mode controller 440 can interface, via mediator 420, with the IMU unit of I/O 416 to determine head position and can interface, via mediator 420, with the eye tracker of I/O 416 to determine eye gaze direction, the combination of which can specify the location of the gaze cursor. Gaze and gesture mode controller 440 can further interface, via mediator 420, with a hand tracking system to identify hand postures which it translates into actions. Additional details on the gaze and gesture interaction mode are provided below in relation to block 584 of FIG. 5.

Ray casting mode controller 442 can provide user inter-actions where direction is indicated with rays controlled by the user and actions are indicated with hand gestures. Ray casting mode controller 442 can interface, via mediator 420, with a position tracking system of I/O 416 to determine user movements along the X, Y, and Z axes and can interface, via mediator 420, with the IMU unit of I/O 416 to determine head position, the combination of which ray casting mode controller 442 can use to determine changes in the user's field-of-view. Ray casting mode controller 442 can further interface, via mediator 420, with a hand tracking system to identify hand postures which it translates into a control point for casting rays and for identifying actions. Additional details on the ray casting interaction mode are provided below in relation to block 584 of FIG. 5.

Those skilled in the art will appreciate that the compo-nents illustrated in FIGS. 1-4 described above, and in each of the flow diagrams discussed below, may be altered in a variety of ways. For example, the order of the logic may be rearranged, substeps may be performed in parallel, illus-trated logic may be omitted, other logic may be included, etc. In some implementations, one or more of the compo-nents described above can execute one or more of the processes described below.

Figure 5:
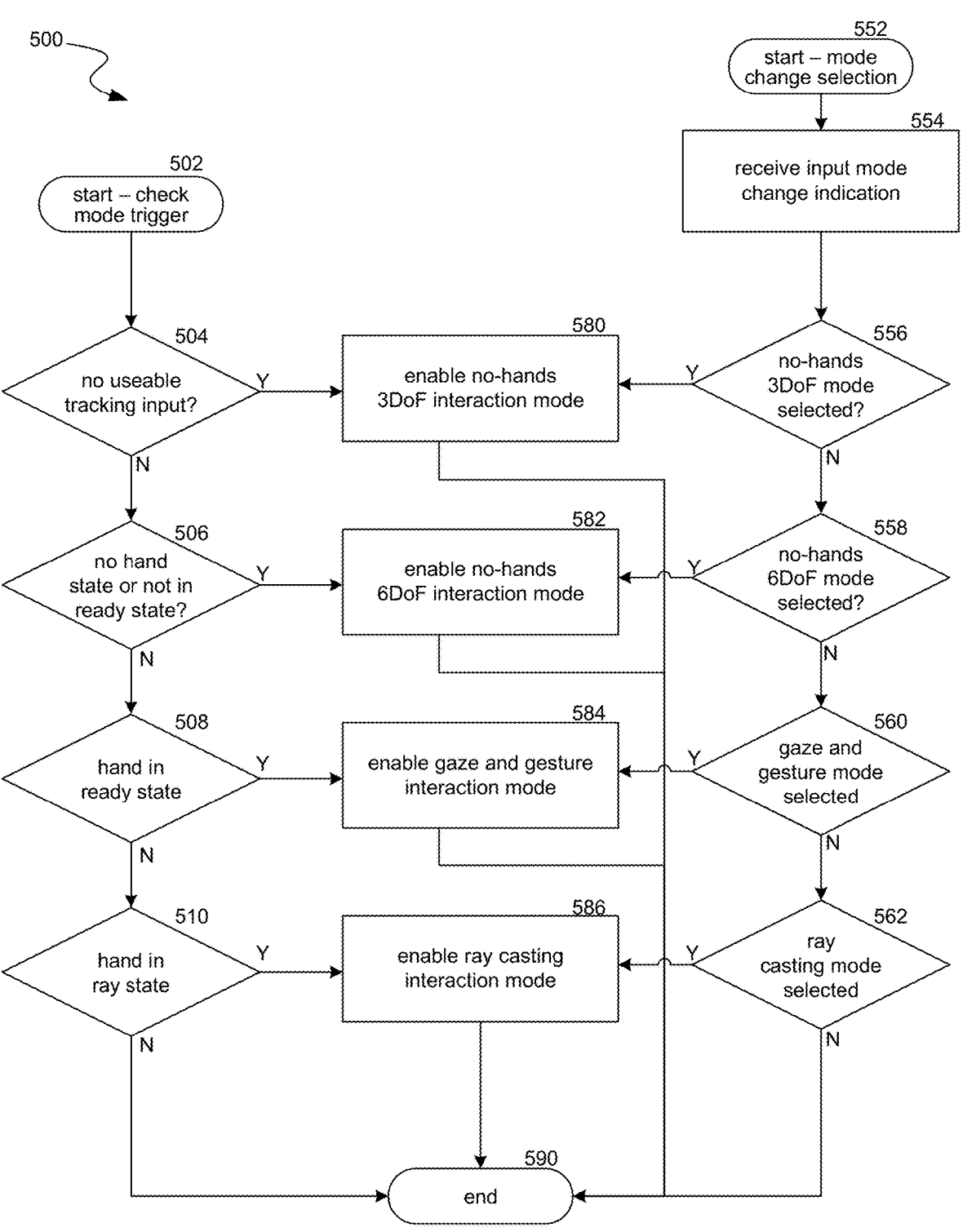
FIG. 5 is a flow diagram illustrating a process used in some implementations of the present technology for identifying a trigger for switching between specified interaction modes and causing the triggered interaction mode to be enabled.

FIG. 5 is a flow diagram illustrating a process 500 used in some implementations of the present technology for identi-fying a trigger for switching between specified interaction modes and causing the triggered interaction mode to be enabled. Process 500 is depicted as having two possible starting points 502 and 552. Process 500 can begin at starting point 552 when an explicit user command is received for manually switching interaction modes. Such a command can be performed, e.g., using a physical button or other control included in an artificial reality system, using a virtual control (e.g., a user interface element) displayed by the artificial reality system, with a voice command, or through a gesture or other input mapped to switching the interaction mode. Process 500 can begin at starting point 502 in response to various indications to check for an interaction mode change trigger, such as a periodic check (e.g., per-formed every 1, 5, or 10 ms) or in response to a detection in a change in interaction mode context factors. In some implementations, the factors that, when changed, cause process 500 to be performed can be different depending on the current interaction mode. For example, if the current interaction mode is the no-hands, 3DoF mode because the interaction mode system is in a low power state, a change in the lighting conditions would not trigger a mode change check, whereas if the current interaction mode is the ray casting mode requiring cameras to capture hand position, a change in the lighting conditions could trigger the mode change check.

From block 502, process 500 can proceed to block 504. At block 504, process 500 can determine if there is no useable input for position tracking and for hand tracking. There may not be useable input for position tracking and hand tracking when cameras used for one of those systems, or correspond-ing processing components such as machine learning mod-els, are disabled (e.g., due to the interaction mode system being in low power or privacy mode, having not yet initial-ized those systems, etc.) or when lighting conditions are insufficient to capture images of sufficient quality for one of these systems. In some implementations, hand or position tracking can be based on a system other than cameras, such as a wearable glove, ring, and/or bracelet for a hand tracking system or time-of-flight sensors or GPS data for a position tracking system, and the determination of useable hand tracking input can be based on whether these systems are enabled and receiving information sufficient to determine hand pose and user position. If there is no such useable tracking input, process 500 can continue to block 580. If there is such useable tracking input, process 500 can con-tinue to block 506.

At block 580, process 500 can enable no-hands, 3DoF interaction mode. In no-hands, 3DoF interaction mode, a user moving parallel to the floor or vertically (i.e., the X, Y, and Z axes) will not cause a corresponding movement in the artificial reality environment (though such movement may be performed using other controls such as a joystick or direction pad on a controller) but the user can indicate direction by moving her head to point at various positions in the artificial reality environment, e.g., using a gaze cursor. In some implementations, the gaze cursor position can be based on both head tracking (e.g., via IMU data indicating pitch, roll, and yaw movements) and eye tracking (e.g., where a camera captures images of the user's eye(s) to determine a direction of the user's gaze). In some cases in the no-hands, 3DoF interaction mode, actions can be performed using a dwell timer, which begins counting down (e.g., from three seconds) when the gaze cursor does not move more than a threshold amount for at least a threshold amount of time (e.g., when the user's gaze remains relatively fixed for at least one second). In some implementations, actions can instead or in addition be indicated in other ways such as by pressing a button on a controller, activating a UI control (i.e., a "soft" button), using voice commands, etc. In some implementations, the action can then be performed in relation to the gaze cursor, e.g., the system performs a default action in relation to one or more objects at which the gaze cursor is pointed. In some implementations, the gaze cursor and/or an indication of the user's gaze direction can be displayed in the user's field-of-view as a visual affordance to indicate the user is in the no-hands, 3DoF interaction mode (or the no-hands, 6DoF interaction mode, discussed below) and to help the user make selections with the gaze cursor. Additional details on gaze cursors and dwell timers are provided below in relation to FIGS. 6, 7, and 10. After the interaction mode has been enabled at block 580, process 500 can end at block 590.

At block 506, process 500 can determine whether position information is available while hands are not identified as being in a ready state. Position information can be available when a positioning system is enabled and is receiving sufficient data to determine a user's movements in 6DoF. In various implementations, such a positioning system can include a system mounted on a wearable portion of the artificial reality system ("inside-out tracking") or external sensors directed at the user to track body position ("outside-in tracking"). Further, these systems can use one or more technologies such as encoded points of light (e.g., infrared) emitted by the artificial reality system and using cameras to track movement of those points; identifying features in captured images and tracking their relative movement across frames (e.g., "motion vectors"); identifying portions of the user in captured images and tracking movement of those portions (e.g., "skeleton tracking"); taking time-of-flight sensor readings from objects in the environment; global positioning system (GPS) data; triangulation using multiple sensors; etc. Determining whether there is sufficient data can include determining whether the position tracking system is enabled (e.g., such systems may be disabled in privacy mode, in low-power mode, in public mode, in do not disturb mode, etc.) and whether they are able to appropriately determine user positions (which may not be possible for some of these systems e.g., in low lighting conditions, where there are not sufficient surfaces nearby to shine light points on, where environment mapping has not yet occurred, where the user is out of frame of a capture device, etc.)

A hand can be identified as being in a ready state when a hand tracking system is enabled and a current hand posture matches a ready state hand posture. Hand tracking systems can include, for example, various technologies such as a camera taking and interpreting images of the user's hand(s) (e.g., using a trained model) or wearable devices such as gloves, rings, or bracelets that take measurements that can be interpreted as user hand postures. Examples of possible ready state hand postures include when the user's palm is facing substantially up (e.g., is rotated at least a threshold amount toward the sky), when the user's fingers are splayed a certain amount, when certain fingers are touching (e.g., thumb and index finger), when the user's hand is tilted past horizontal by a certain degree, when the user makes a fist, etc. In some implementations, the hand ready state can require that the hands be in the user's field-of-view, be raised above a certain threshold (e.g., be above hip level), or that the user's elbow(s) is bent at least a certain amount. Additional details on hand ready states are provided below in relation to FIG. 8. In some implementations, bock 506 can also determine whether the hands are not in a state mapped to another interaction mode, such as the ray state discussed below in relation to blocks 508 and 510. If position information is available and hands are not identified as being in a ready state (or another interaction mode mapped state), process 500 can continue to block 582, otherwise process 500 can continue to block 508.

At block 582, process 500 can enable the no-hands, 6DoF interaction mode. The no-hands, 6DoF interaction mode can provide similar interactions as the no-hands, 3DoF interaction mode described above, except that user movements parallel to the floor and vertically (i.e., along the X, Y, and Z axes) are detected and translated into point-of-view movement in the artificial reality environment. Point of view movement and head and/or eye tracking can be used to position a gaze cursor. As with the no-hands, 3DoF interaction mode, actions in the no-hands, 6DoF interaction mode can be performed with a dwell timer and/or other user controls (e.g., physical or soft buttons, voice commands, etc.), which can be performed in relation to the gaze cursor. After the interaction mode has been enabled at block 582, process 500 can end at block 590.

At block 508, process 500 can determine whether the hands are in the ready state, as discussed above. If so, process 500 can continue to block 584; if not, process 500 can continue to block 510.

At block 584, process 500 can enable a gaze and gesture interaction mode. The gaze and gesture interaction mode can include a gaze cursor as discussed above. In some implementations, gaze and gesture interaction mode will always use position tracking, allowing the user to control her position in the artificial reality environment by moving in the real world while in other cases position tracking may or may not be enabled for gaze and gesture interaction mode. When, at block 584, position tracking is enabled, the gaze cursor can be controlled by the user in 6DoF and when position tracking is not enabled at block 584, the gaze cursor can be controlled by the user in 3DoF. A dwell timer may or may not be enabled in the gaze and gesture interaction mode.

With hand tracking enabled and the hands in a ready state, the gaze and gesture interaction mode can enable actions based on user gestures. For example, a default action can be performed when a user performs a particular gesture, such as bringing her thumb and index finger together. In some implementations, different actions can be mapped to different gestures. For example, a first action can be performed when the user brings her thumb and index finger together and a second action can be performed when the user brings her thumb and middle finger together. One or more of many different gestures can be used by the gaze and gesture interaction mode, such as swipe gestures, air tap gestures, grip gestures, finger extension gestures, finger curl gestures, etc. In some cases, visual affordances can be used to signal to the user that the gaze and gesture interaction mode is enabled and/or that a gesture is being recognized. For example, the hand ready state can be the user's palm being substantially directed upward and a visual affordance for the gaze and gesture interaction mode can include placing a sphere between the user's thumb and index finger (see FIG. 8). This can both signal to the user that the gaze and gesture interaction mode is enabled and provide feedback for a pinch gesture between these fingers (e.g., by distorting or resizing the sphere as the user brings these fingers together). Other visual affordances can also be used, such as by showing tracing of user hand movement, placing indicators of different actions that can be performed near the tip of each finger, or showing indicators on one wrist that can be tapped by a finger from the other hand. Additional details on the gaze and gesture interaction mode with visual affordances are provided below in relation to FIG. 8. After the interaction mode has been enabled at block 584, process 500 can end at block 590.

At block 510, process 500 can determine whether the user's hands are in a ray state. Similar to the processes described above with respect to blocks 506 and 508, this can include determining whether hand tracking is enabled, whether there is sufficient data to determine a hand posture, and/or whether one or more hands is in-view, raised above a threshold, or that the user's elbow is bent above a threshold amount. Identifying the ray state can also include determining that one or both of the user's hands are in a pose mapped to performing ray casting. Examples of such poses can include the user's hand rotated so her palm is substantially pointing downward (e.g., is rotated at least a threshold amount toward the floor), that a finger (e.g., the index finger) is extended, that certain fingers are touching (e.g., the thumb, middle, and ring fingers), etc. If the user's hand(s) are identified as being in the ray state, process 500 can continue to block 586. If the user's hand(s) are not identified as being in the ray state, process 500 does not make a change to the current interaction mode, and can continue to block 590, where it ends.

At block 586, process 500 can enable the ray casting interaction mode. The ray casting interaction mode can allow a user to make selections with a "ray," which can be a curved or straight line segment, a cone, a pyramid, a cylinder, a sphere, or another geometry whose position is directed by the user (often based on the position of at least one hand of the user). Additional details on ray casting are provide in U.S. patent application Ser. No. 16/578,221, incorporated herein by reference in its entirety. For example, a ray may be a line extending from a first point between the tip of user's index finger and the tip of her thumb, along a line connecting the first point with a second point at a pivot point on the user's palm between the user's thumb and index finger. As with the gaze and gesture interaction mode, in various implementations, the ray casting interaction mode may always use position tracking, allowing the user to control her position in the artificial reality environment by moving along the X, Y, and Z axes in the real world while in other cases position tracking may or may not be enabled. In either case, the ray casting interaction mode allows the user to make selections based on the ray cast by the user, either from a single position (in 3DoF) or as the user moves about the artificial reality environment (in 6DoF). In the ray casting interaction mode, the user can perform an action in relation to the ray and/or objects with which the ray intersects, e.g., by making a gesture such as a pinch, air tap, grab, etc. As with all the interaction modes, in some implementations, other actions can also be performed, e.g., using controller or soft buttons, voice commands, etc. In some implementations, the ray casting interaction mode can include a visual affordance with a shape (e.g., a teardrop shape) at the point between the tips of the user's fingers from which the ray emanates. In some implementations, this shape can be resized, distorted, or otherwise changed as the user makes a gesture. For example, the teardrop shape can be compressed as the user brings her thumb-tip and fingertip closer together. Additional details on the ray casting interaction mode with visual affordances are provided below in relation to FIG. 9. After the interaction mode has been enabled at block 586, process 500 can end at block 590.

As noted previously, in some implementations process 500 can begin at block 552 instead of block 502. This can occur, for example, when the user provides an indication for manually transitioning interaction modes. In various implementations, this indication can be performed by activating a physical control, a soft control, speaking a command, performing a gesture, or some other command mapped to a particular interaction mode or to cycling through interaction modes. This indication can be received at block 554. At block 556, process 500 can determine if the interaction mode change indication corresponds to the no-hands, 3DoF interaction mode (e.g., is either mapped to that mode or is a next mode from a current mode in a cycle of modes). If so, process 500 continues to block 580 (discussed above); if not, process 500 continues to block 558. At block 558, process 500 can determine if the interaction mode change indication corresponds to the no-hands, 6DoF interaction mode (e.g., is either mapped to that mode or is a next mode from a current mode in a cycle of modes). If so, process 500 continues to block 582 (discussed above); if not, process 500 continues to block 560. At block 560, process 500 can determine if the interaction mode change indication corresponds to the gaze and gesture interaction mode (e.g., is either mapped to that mode or is a next mode from a current mode in a cycle of modes). If so, process 500 continues to block 584 (discussed above); if not, process 500 continues to block 562. At block 562, process 500 can determine if the interaction mode change indication corresponds to the ray casting interaction mode (e.g., is either mapped to that mode or is a next mode from a current mode in a cycle of modes). If so, process 500 continues to block 586 (discussed above); if not, process 500 does not make an interaction mode change and continues to block 590, where it ends.

Figure 6:
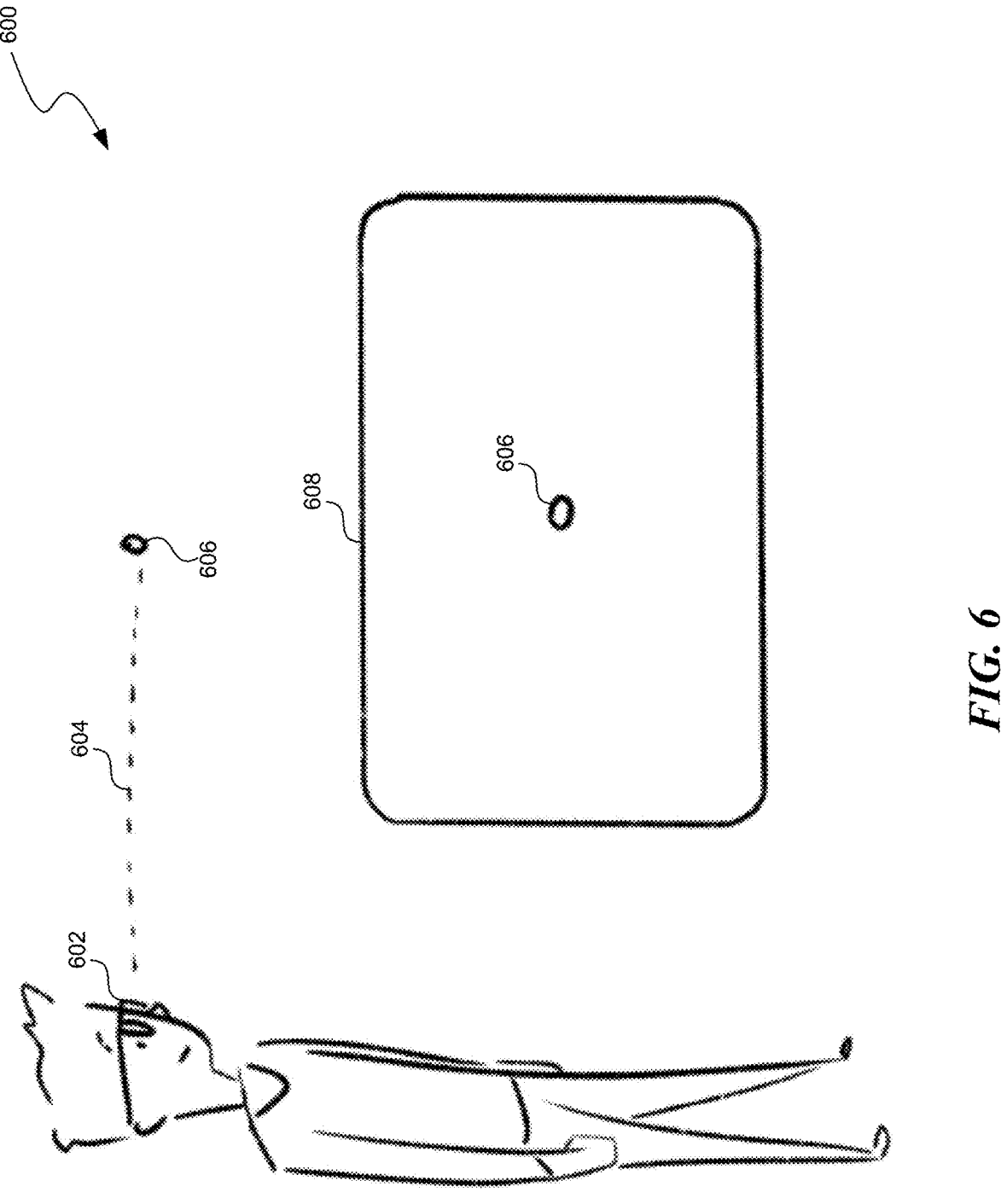
FIG. 6 is a conceptual diagram illustrating an example gaze cursor.

FIG. 6 is a conceptual diagram illustrating an example 600 with a gaze cursor 606. The gaze cursor 606 is a selection mechanism controlled by at least a user's head position, and in some implementations, further controlled by a user's eye gaze direction. Example 600 further includes a user's field-of-view 608, which is what the user can see through his artificial reality device 602. Field-of-view 608 includes the gaze cursor 606 as viewed by the user, projected into the field-of-view 608 by the artificial reality device 602. The gaze cursor 606 can be along a direction indicated by line 604 (which may or may not be displayed to a user). Where the line 604 is not based on eye tracking, the line 604 can be perpendicular to the coronal plane of the user's head and can intersect with a point between the user's eyes. In general, when there is no eye tracking, the gaze cursor 606 will be in the center of the user's field-of-view 608. In some implementations, the gaze cursor 606 can be further based on the user's tracked eye gaze direction. In the eye tracking case, the user's field-of-view 608 is an area based on the user's head position, but the position of the gaze cursor 606 within the field-of-view 608 can be controlled based on a determination of a direction of the user's gaze and/or a point in the field-of-view at which the user is looking. In some implementations, the gaze cursor 606 can appear to be at a specified distance from the user, at a determined focal plane of the user, or on the nearest object (real or virtual) with which the line 604 intersects. Another example of gaze cursor is provided in relation to FIGS. 10A and 10B.

Figure 7:
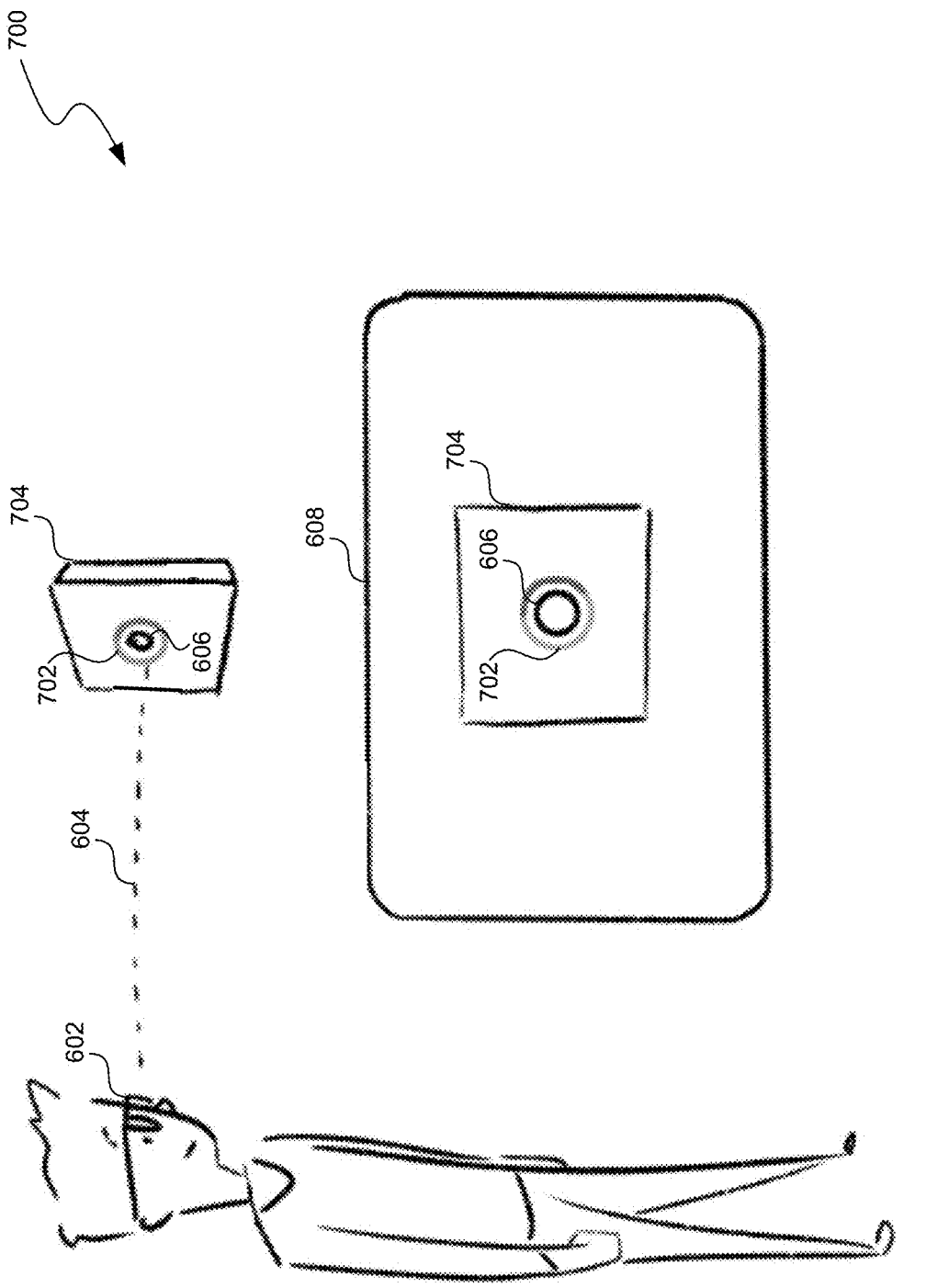
FIG. 7 is a conceptual diagram illustrating an example gaze cursor with a dwell timer.

FIG. 7 is a conceptual diagram illustrating an example 700 with a dwell timer 702. The dwell timer 702 can be for a set amount of time (e.g., three second, four seconds, etc.) that begins when the gaze cursor 606 has not moved above a threshold amount (e.g., when line 604 has not moved by more than three degrees) within a threshold time (e.g., one second). The dwell timer can reset if the gaze cursor 606 moves more than the threshold amount before the dwell timer expires. In some implementations, the dwell timer 702 only begins when the gaze cursor 606 is pointed at an object for which a default action can be taken when the dwell timer expires (e.g., object 704). In some cases, a visual affordance can be shown when the dwell timer begins, such as the ring around the gaze cursor 606 where a percentage of the ring changes color or shading according to a percentage of the dwell timer that remains.

Figure 8:
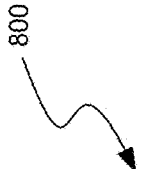
FIG. 8 is a conceptual diagram illustrating an example gaze cursor with hand gesture selections.
Figure 8:
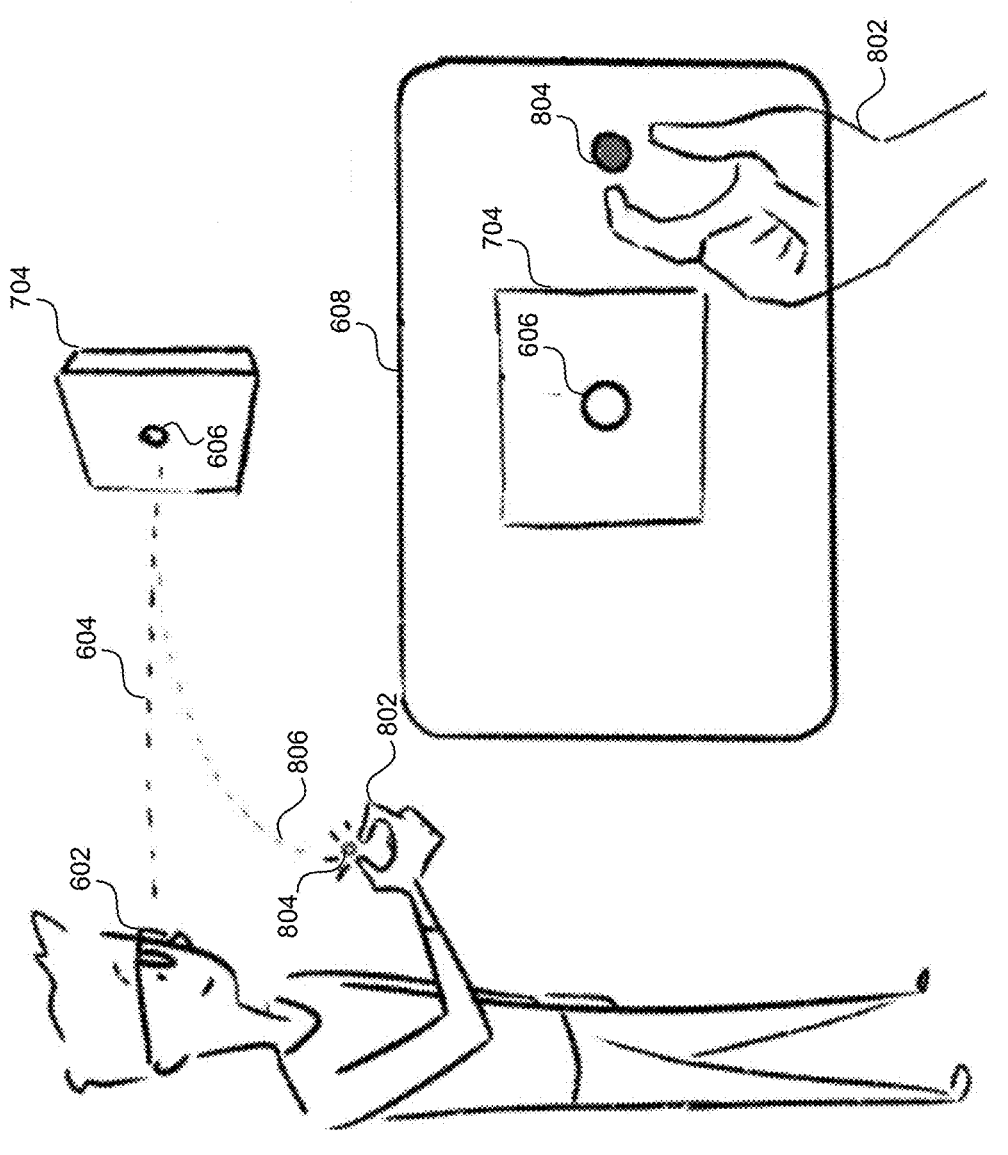

FIG. 8 is a conceptual diagram illustrating an example 800 with gaze cursor 606 and further utilizing hand gesture selections. In example 800, gaze and gesture interaction mode has been enabled in response to a determination that the user's hand 802 is in a ready state based on the user's hand 802 being the user's field-of-view 608 and in a palm-up pose. In this gaze and gesture interaction mode, the user continues to use the gaze cursor 606 (see FIG. 6) to indicate direction. However, instead of using dwell timer 702 (FIG. 7) to perform an action, the user can perform a pinch gesture between his thumb and index finger to trigger an action. As indicated by line 806, such a pinch action is interpreted in relation to the gaze cursor 606. For example, where the default action to is to select an object, because gaze cursor 606 is on object 704, when the user performs a pinch gesture object 704 is selected. Upon enabling the gaze and gesture interaction mode, a visual affordance was displayed in the user's field-of-view 608 as a sphere 804 between the thumb and index finger on the user's hand 802. When the user begins to bring his thumb and index finger together, the sphere 804 can be compressed into an ellipsoid to indicate to the user a part of the pinch gesture is being recognized.

Figure 9:
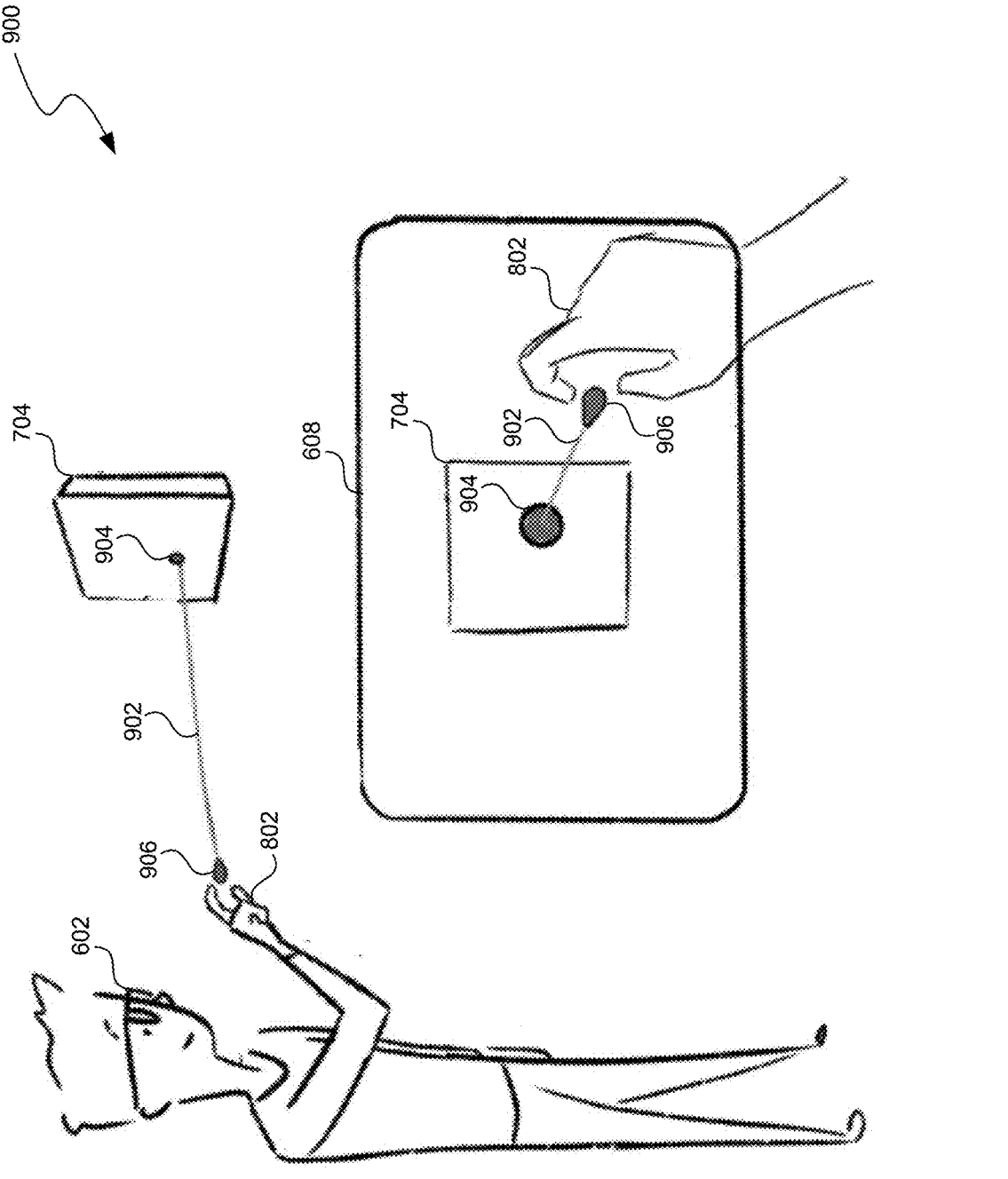
FIG. 9 is a conceptual diagram illustrating an example of ray casting direction input with hand gesture selection.

FIG. 9 is a conceptual diagram illustrating an example 900 with ray casting direction input with hand gesture selection. In example 900, ray casting interaction mode has been enabled in response to a determination that the user's hand 802 is in a ray state based on the user's hand 802 being the user's field-of-view 608 and in a palm down pose. In this ray casting interaction mode, a ray 902 is cast from a point between the user's thumb and index finger. The user can perform a pinch gesture between his thumb and index finger to trigger an action. Such a pinch action is interpreted in relation to one or more objects (e.g., object 704) with which the ray intersects. For example, where the default action to is to select an object, because ray 902 intersects with object 704, when the user performs a pinch gesture object 704 is selected. Upon enabling the ray casting interaction mode, a first visual affordance was displayed in the user's field-of-view 608 as a teardrop shape 906 between the thumb and index finger on the user's hand 802. When the user begins to bring his thumb and index finger together, the teardrop 906 can be compressed to indicate to the user a part of the pinch gesture is being recognized. Also upon enabling the ray casting interaction mode, visual affordances showing the line of ray 902 and the point 904 where the line 902 intersects with an object are displayed.

Figure 10A:
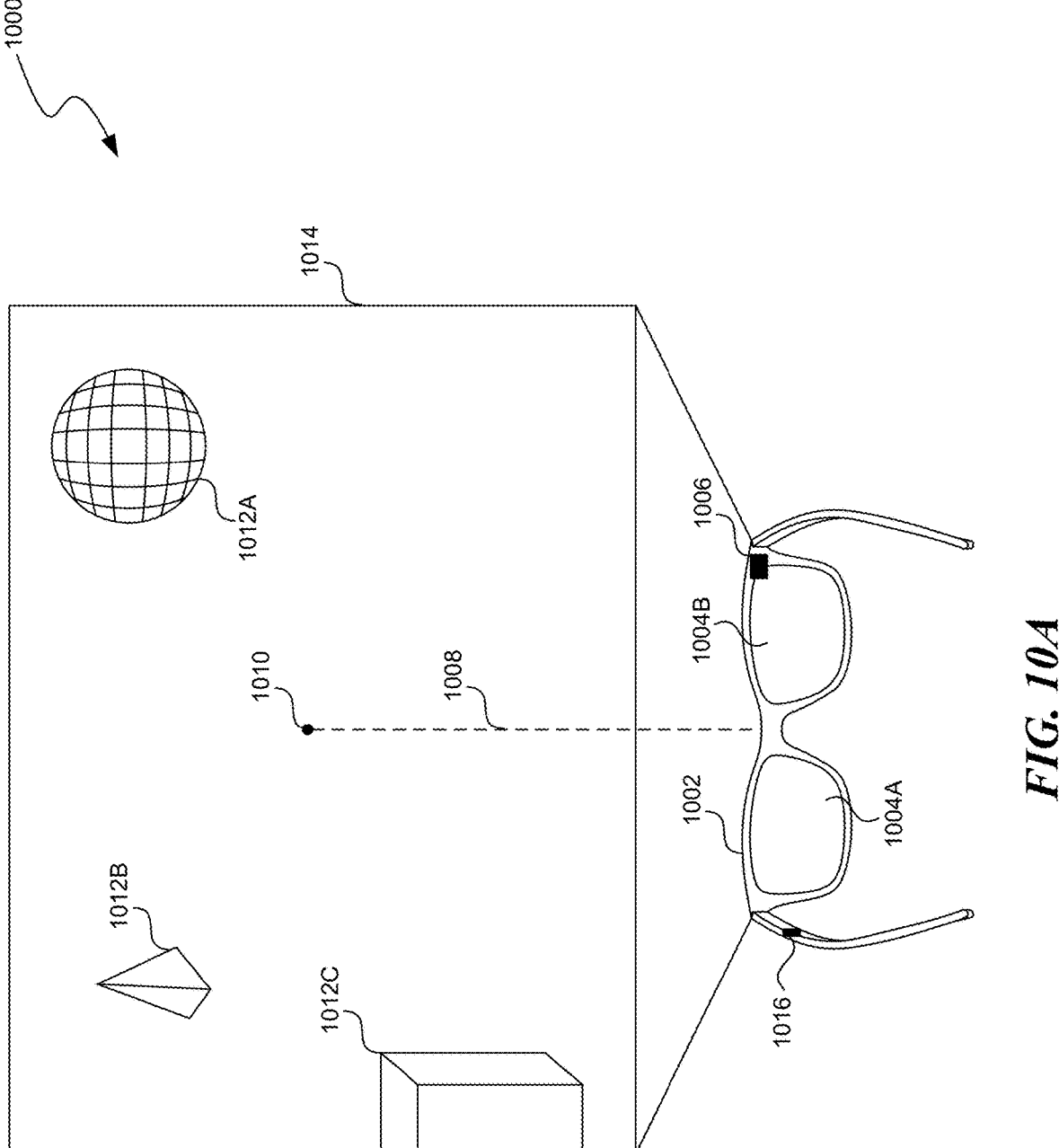
FIGS. 10A and 10B are conceptual diagrams illustrating an example interaction between device positioning and object selection using an eye-tracking based gaze cursor with a dwell timer.
Figure 10B:
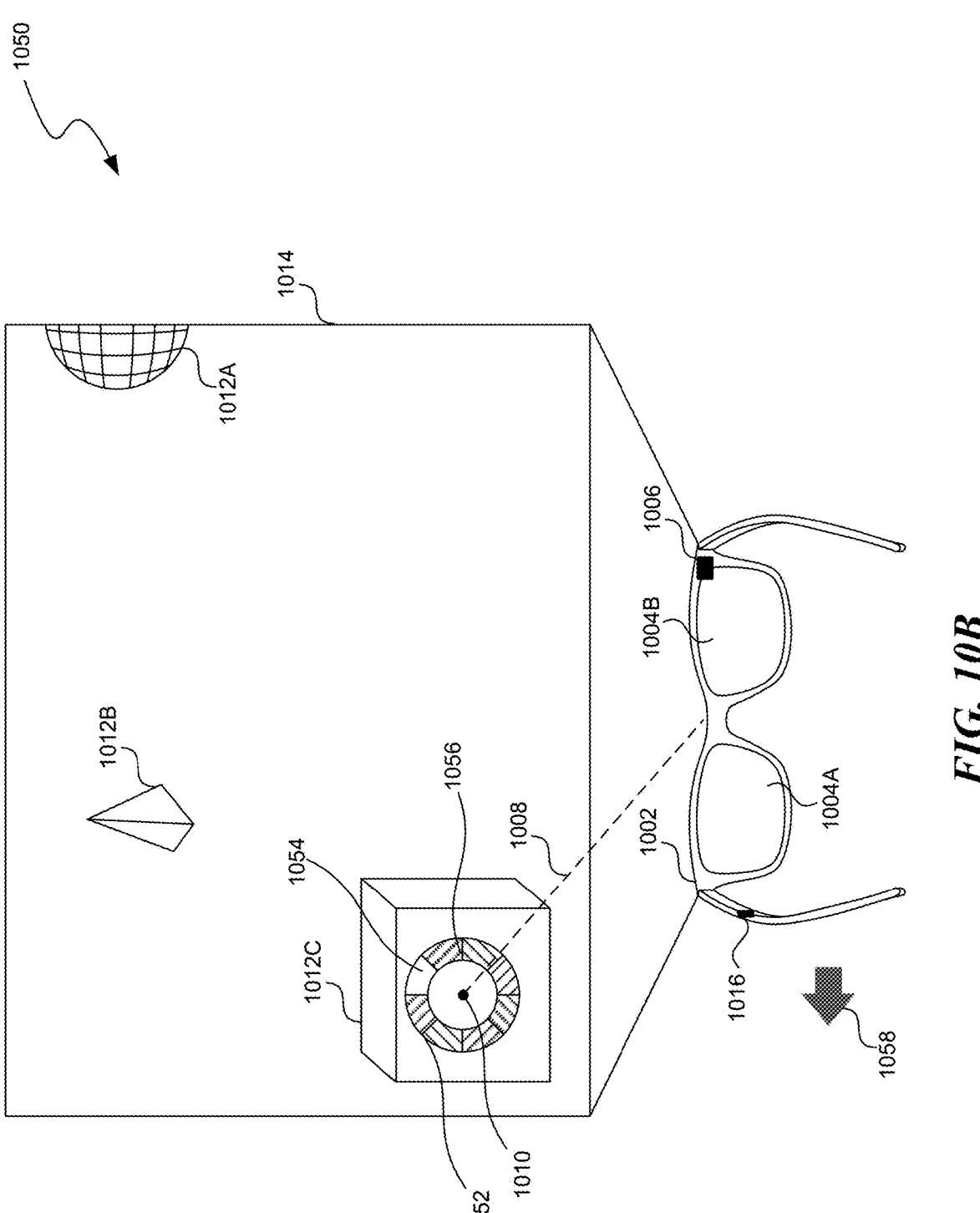

FIGS. 10A and 10B are conceptual diagrams illustrating examples 1000 and 1050 with interaction between device positioning and object selection using an eye-tracking-based gaze cursor with a dwell timer. Example 1000 includes artificial reality glasses 1002 with waveguide lenses 1004A and 1004B that project light into a user's eyes to cause the user to see a field-of-view 1014. In some embodiments, the artificial reality glasses 1002 may be similar to glasses 252 discussed above with reference to FIG. 2B. A direction in an artificial reality environment for the field-of-view 1014 is controlled by head tracking unit 1016 of the artificial reality glasses 1002. Head tracking unit 1016 can use, e.g., a gyroscope, magnetometer, and accelerometer to determine a direction and movement of the artificial reality glasses 1002 for the artificial reality glasses 1002 to translate into a camera position in the artificial reality environment from which to display content. In example 1000, field-of-view 1014 displays virtual objects 1012A, 1012B, and 1012C. Artificial reality glasses 1002 include eye tracking module 1006 which includes a camera and light source (e.g., infrared light) that illuminates glints on the user's eyes, takes pictures of the user's eyes, and uses a trained machine learning model to interpret the images into a gaze direction (indicated by line 1008). At the end of the eye gaze direction line 1008 is a gaze cursor 1010. In example 1000, the user is looking at the center of the field-of-view 1014, causing the gaze cursor 1010 to be positioned there.

In example 1050, the user has moved her head to the left, as indicated by arrow 1058. This movement was tracked by head tracking unit 1016, causing the field-of-view 1014 to shift left, resulting in virtual objects 1012A, 1012B, and 1012C to shift right in the field-of-view 1014. The user has also transitioned her gaze from the center of the field-of-view 1014 to the lower-left corner of the field-of-view 1014. This change in eye gaze was tracked by eye tracking unit 1006, as indicated by line 1008. This causes gaze cursor 1010 to be on virtual object 1012C. After the user has held her gaze on object 1012C for one second, dwell timer 1052 beings to count down from three seconds. This is shown to the user through visual affordances 1054 and 1056, where the portion 1056 of the ring that is shaded corresponds to the amount of the dwell timer that remains. When the dwell timer reaches zero, the artificial reality glasses 1002 take the default action of selecting the object 1012C on which the gaze cursor 1010 rests.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

Various aspects of the above technologies are described as being done with hand tracking systems. In each case, these technologies can use controller tracking instead. For example, where a hand tracking system is used to determine a hand gesture or for an origin point for casting a ray, a tracked position of a controller can be used instead.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

I claim:

1. A non-transitory computer-readable storage medium storing instructions that, when executed by a computing system communicatively coupled with an artificial reality system, cause the computing system to perform:
   selecting a first interaction mode for interpreting a user input in an artificial reality system by identifying first interaction mode context based on first sensor data obtained by a first set of sensors;
   in response to selecting the first interaction mode, enabling the first interaction mode, wherein the first interaction mode includes at least: a no-hands interaction mode in which at least some user interactions are performed using a gaze cursor;

selecting a second interaction mode for interpreting the user input in the artificial reality system by identifying second interaction mode context based on second sensor data obtained by a second set of sensors, wherein the second sensor data is distinct from the first sensor data; and
   in response to selecting the second interaction mode, enabling the second interaction mode, wherein the second interaction mode includes at least: gaze and gesture interaction mode in which at least some user interactions are performed through a combination of a tracked user gaze and identified user gestures.

2. The non-transitory computer-readable storage medium of claim 1, wherein the first interaction mode comprises:
   receiving user indications of direction at least based on a determined orientation of a user's head, wherein a position of the gaze cursor is based on the user indications of direction; and
   receiving user indications of an action, in relation to one of the user indications of direction, based on a dwell timer;
   wherein:
      when user position tracking input is not available, the first interaction mode does not translate user movements in X, Y, and Z axes into field-of-view movements in the X, Y, and Z axes in an artificial reality environment; and
      when user position tracking input is available, the first interaction mode automatically translates user movements in the X, Y, and Z axes into field-of-view movements in the X, Y, and Z axes in an artificial reality environment.

3. The non-transitory computer-readable storage medium of claim 1, wherein the first interaction mode comprises:
   receiving user indications of direction at least based on a determined orientation of a user's head, wherein a position of the gaze cursor is based on the user indications of direction; and
   receiving user indications of an action, in relation to one of the user indications of direction, based on a dwell timer.

4. The non-transitory computer-readable storage medium of claim 1,
   wherein the tracked user gaze, of the second interaction mode, is tracked by receiving user indications of direction at least based on a determined orientation of a user's head and based on a determined position of the user's head in relation to an artificial reality environment, wherein the determined position of the user's head is based in part on tracked movements of the user along X, Y, and Z axes; and
   wherein the identified user gestures, of the second interaction mode, are received in relation to one of the user indications of direction and are determined by tracking a user's hand postures and matching at least one of the user's hand postures to specified actions.

5. The non-transitory computer-readable storage medium of claim 1, wherein the identifying the first interaction mode context includes identifying, based on the first sensor data, that hand tracking input is not available or identifying that a first tracked hand pose does not match a hand ready state.

6. The non-transitory computer-readable storage medium of claim 1, wherein the identifying the second interaction mode context includes identifying, based on the second sensor data, that a second tracked hand pose matches a hand ready state that comprises a hand pose identified as a user's palm facing at least a threshold amount upward.

7. The non-transitory computer-readable storage medium of claim 1, wherein the second interaction mode also utilizes the gaze cursor; and wherein the gaze cursor, in the second interaction mode, is illustrated in a field-of-view for the user, positioned based at least in part on a tracked position of user's head and based on a tracked gaze direction of the user.

8. The non-transitory computer-readable storage medium of claim 1, wherein the identifying the first interaction mode context includes identifying, based on the first sensor data, that user position tracking input is not available;

wherein the first interaction mode comprises enabling a no-hands, three-degree-of-freedom interaction mode; and wherein, while in the no-hands, three-degree-of-freedom interaction mode, user movements in X, Y, and Z axes do not automatically translate to field-of-view movements in the X, Y, and Z axes in an artificial reality environment.

9. The non-transitory computer-readable storage medium of claim 1, wherein the identifying the first interaction mode context, based on the first sensor data, includes identifying that: user position tracking input is available; and hand tracking input is not available or that a first tracked hand pose does not match a hand ready state, and wherein the enabling the first interaction mode comprises enabling a no-hands, six-degree-of-freedom interaction mode; and wherein, while in the no-hands, six-degree-of-freedom interaction mode, user movements in X, Y, and Z axes are automatically translated to field-of-view movements in the X, Y, and Z axes in an artificial reality environment.

10. The non-transitory computer-readable storage medium of claim 1, wherein the instructions, when executed by the computing system, further cause the computing system to perform:

selecting a third interaction mode for interpreting the user input in the artificial reality system by identifying third interaction mode context based on third sensor data obtained by a third set of sensors, wherein the third sensor data is distinct from the first and second sensor data;

in response to selecting the third interaction mode, enabling the third interaction mode, wherein the third interaction mode includes at least: a ray casting interaction mode in which at least some user interactions are performed using a virtual ray projection cast out from a tracked position of a user's hand; and enabling one of the first interaction mode, the second interaction mode, or the third interaction mode for interpreting the user input in the artificial reality system in response to receiving a user instruction to change from a current interaction mode to an indicated interaction mode including, at least, the first interaction mode, the second interaction mode, and the third interaction mode.

11. The non-transitory computer-readable storage medium of claim 10, wherein the third interaction mode provides a visual affordance including a shape illustrated in a field-of-view of the user positioned between a user's thumb and at least one other finger; and wherein the shape is illustrated as resized or distorted according to a determined distance between the user's thumb and the at least one other finger.

12. The non-transitory computer-readable storage medium of claim 10, wherein the identifying the third interaction mode context includes identifying, based on the third sensor data, that a third tracked hand pose matches a ray state that comprises a hand pose identified as a user's palm facing at least a threshold amount downward.

13. A computing system for transitioning between interaction modes for interpreting user input in an artificial reality system, the computing system comprising:

one or more processors; and one or more memories storing instructions that, when executed by the one or more processors, cause the computing system to perform a process comprising:

selecting a first interaction mode for interpreting a user input in an artificial reality system by identifying first interaction mode context based on first sensor data obtained by a first set of sensors;

in response to selecting the first interaction mode, enabling the first interaction mode, wherein the first interaction mode includes at least: a no-hands interaction mode in which at least some user interactions are performed using a gaze cursor;

selecting a second interaction mode for interpreting the user input in the artificial reality system by identifying second interaction mode context based on second sensor data obtained by a second set of sensors, wherein the second sensor data is distinct from the first sensor data; and in response to selecting the second interaction mode, enabling the second interaction mode, wherein the second interaction mode includes at least: a gaze and gesture interaction mode in which at least some user interactions are performed through a combination of a tracked user gaze and identified user gestures.

14. The computing system of claim 13, wherein the first interaction mode comprises:

receiving user indications of direction at least based on a determined orientation of user's head, wherein a position of the gaze cursor is based on the user indications of direction; and receiving user indications of an action, in relation to one of the user indications of direction, based on a dwell timer.

15. The computing system of claim 13, wherein the tracked user gaze, of the second interaction mode, is tracked by receiving user indications of direction at least based on a determined orientation of a user's head and based on a determined position of the user's head in relation to an artificial reality environment, wherein the determined position of the user's head is based in part on tracked movements of the user along X, Y, and Z axes; and wherein the identified user gestures, of the second interaction mode, are received in relation to one of the user indications of direction and are determined by tracking a user's hand postures and matching at least one of the user's hand postures to specified actions.

16. The computing system of claim 13, wherein the instructions, when executed by the one or more processors, cause the computing system to further perform a process comprising:

selecting a third interaction mode for interpreting the user input in the artificial reality system by identifying third interaction mode context based on third sensor data obtained by a third set of sensors, wherein the third sensor data is distinct from the first and second sensor data;

in response to selecting the third interaction mode, enabling the third interaction mode, wherein the third interaction mode includes at least: a ray casting interaction mode in which at least some user interactions are performed using a virtual ray projection cast out from a tracked position of a user's hand; and enabling one of the first interaction mode, the second interaction mode, or the third interaction mode for interpreting the user input in the artificial reality system in response to receiving a user instruction to change from a current interaction mode to an indicated interaction mode including, at least, the first interaction mode, the second interaction mode, and the third interaction mode.

17. The computing system of claim 16, wherein the identifying the second interaction mode context includes identifying, based on the second sensor data, that a second tracked hand pose matches a hand ready state that comprises a hand pose identified as a user's palm facing at least a threshold amount upward; or wherein the identifying the third interaction mode context includes identifying, based on the third sensor data, that a third tracked hand pose matches a ray state that comprises a hand pose identified as the user's palm facing at least a threshold amount downward.

18. A method for transitioning between interaction modes for interpreting user input in an artificial reality system, the method comprising:

selecting a first interaction mode for interpreting a user input in an artificial reality system by identifying first interaction mode context based on first sensor data obtained by a first set of sensors;

in response to selecting the first interaction mode, enabling the first interaction mode, wherein the first interaction mode includes at least: a no-hands interaction mode in which at least some user interactions are performed using a gaze cursor;

selecting a second interaction mode for interpreting the user input in the artificial reality system by identifying second interaction mode context based on second sensor data obtained by a second set of sensors, wherein the second sensor data is distinct from the first data; and in response to selecting the second interaction mode, enabling the second interaction mode, wherein the second interaction mode includes at least: a gaze and gesture interaction mode in which at least some user interactions are performed through a combination of a tracked user gaze and identified user gestures.

19. The method of claim 18, wherein the tracked user gaze, of the second interaction mode, is tracked by receiving user indications of direction at least based on a determined orientation of a user's head and based on a determined position of the user's head in relation to an artificial reality environment, wherein the determined position of the user's head is based in part on tracked movements of the user along X, Y, and Z axes; and wherein the identified user gestures, of the second interaction mode, are received in relation to one of the user indications of direction and are determined by tracking a user's hand postures and matching at least one of the user's hand postures to specified actions.

20. The method of claim 18, wherein the identifying the second interaction mode context includes identifying, based on the second sensor data, that a second tracked hand pose matches a hand ready state that comprises a hand pose identified as a user's palm facing at least a threshold amount upward and wherein the second interaction mode context is mapped to a gaze and gesture interaction mode; or wherein the identifying the first interaction mode context includes identifying, based on the first sensor data, that hand tracking input is not available or identifying that a first tracked hand pose does not match a hand ready state and wherein the first interaction mode context is mapped to a no-hands interaction mode.

* * * * *